US009203070B2

(12) United States Patent
Kumar et al.

(10) Patent No.: US 9,203,070 B2
(45) Date of Patent: Dec. 1, 2015

(54) METHOD TO PRODUCE NANOPOROUS POLYMERIC MEMBRANES

(71) Applicant: University of Washington through its Center for Commercialization, Seattle, WA (US)

(72) Inventors: Vipin Kumar, Seattle, WA (US); Brian Aher, Seattle, WA (US); Krishna Nadella, Redmond, WA (US); Michael Waggoner, Seattle, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 0 days.

(21) Appl. No.: 14/213,112

(22) Filed: Mar. 14, 2014

(65) Prior Publication Data

US 2014/0287321 A1    Sep. 25, 2014

Related U.S. Application Data

(60) Provisional application No. 61/783,951, filed on Mar. 14, 2013.

(51) Int. Cl.
| | |
|---|---|
| *C08J 9/00* | (2006.01) |
| *B29D 7/00* | (2006.01) |
| *B29C 43/00* | (2006.01) |
| *B29C 44/00* | (2006.01) |
| *B29C 44/10* | (2006.01) |
| *B29C 59/02* | (2006.01) |
| *B29C 67/20* | (2006.01) |
| *H01M 2/14* | (2006.01) |
| *H01M 2/16* | (2006.01) |

(52) U.S. Cl.
CPC ............ *H01M 2/145* (2013.01); *H01M 2/1653* (2013.01)

(58) Field of Classification Search
None
See application file for complete search history.

(56) References Cited

U.S. PATENT DOCUMENTS 5,338,765 A * 8/1994 Near et al. ............. 521/50.5
2008/0274346 A1* 11/2008 Miller et al. ............ 428/315.7

OTHER PUBLICATIONS

Miller et al., "Microcellular and nanocellular solid-state polyetherimide (PEI) foams using sub-critical carbon dioxide II. Tensile and impact properties." Polymer. 52. (2011) pp. 2910-2919.*
Nadella et al. "Constrained Solid-State Foaming of Microcellular Panels." Cellular Polymers. vol. 24, No. 2, 2005. pp. 71-90.*
Miller et al., "Microcellular and nanocellular solid-state polyetherimide (PEI) foams using sub-critical carbon dioxide I. Processing and Structure." Polymer 50. (2009), pp. 5576-5584.*
Arora, K.A., et al., "Preparation and Characterization of Microcellular Polystyrene Foams Processed in Supercritical Carbon Dioxide," Macromolecules 31(14):4614-4620, Jul. 1998.

(Continued)

*Primary Examiner* — Kara Boyle
(74) *Attorney, Agent, or Firm* — Christensen O'Connor Johnson Kindness PLLC

(57) ABSTRACT

A method for making a flat polymer foam having a core layer of nano-sized open, interconnected cells that includes saturating a solid-state polymer with a supercritical fluid, allowing the gas to desorb for at least 35 minutes, and then heating the gas-saturated solid polymer for at least 3 minutes while constraining the foam in the thickness dimension. Any skin layer formed on the exterior may be removed via polishing, thus creating a foam with an open structure from side to side. The foam can be used as a battery separator.

8 Claims, 26 Drawing Sheets

(56) References Cited

OTHER PUBLICATIONS

Baldwin, D.F., et al., "A Microcellular Processing Study of Poly(Ethylene Terephthalate) in the Amorphous and Semicrystalline States. Part I: Microcell Nucleation," Polymer Engineering and Science 36(11):1437-1445, May 1996.

Fujimoto, Y., et al., "Well-Controlled Biodegradable Nanocomposite Foams: From Microcellular to Nanocellular," Macromolecular Rapid Communications 24(7):457-461, May 2003.

Krause, B., et al., "Bicontinuous Nanoporous Polymers by Carbon Dioxide Foaming," Macromolecules 34(25):8792-8801, Dec. 2001.

Kumar, V., and J. Weller, "Production of Microcellular Polycarbonate Using Carbon Dioxide for Bubble Nucleation," Journal of Engineering for Industry 116(4):413-420, Nov. 1994.

Kumar, V., and K.V. Nadella, "Microcellular Foams," in D. Eaves (ed.), "Handbook of Polymer Foams," Rapra Technology Limited, Shropshire, U.K., 2004, pp. 243-267.

Lu, J.C., "Processing and Characterization of Thermoplastic Microcellular Thin Films," Master's Thesis, University of Washington, Seattle, 2008, 164 pages.

Martini, J., et al., "The Production and Analysis of Microcellular Foam," SPE Technical Papers, XXVIII:674-676, 1982.

Miller, D., "Characterization of Polyetherimide Carbon Dioxide System and Mechanical Properties of High Relative Density Polyetherimide Nanofoams," Master's Thesis, University of Washington, Seattle, 2007, 174 pages.

Miller, D., et al., "Microcellular and Nanocellular Solid-State Polyetherimide (PEI) Foams Using Sub-Critical Carbon Dioxide I. Processing and Structure," Polymer 50(23):5576-5584, Nov. 2009.

Miller, D., and V. Kumar, "Microcellular and Nanocellular Solid-State Polyetherimide (PEI) Foams Using Sub-Critical Carbon Dioxide II. Tensile and Impact Properties," Polymer 52(13):2910-2919, Jun. 2011.

Montecillo, R., "Feasibility of Producing Microcellular Thin Films in the Polycarbonate-Carbon Dioxide System," Master's Thesis, University of Washington, Seattle, 1994, pp. 22-73 and pp. 104-106.

Nadella, K., et al., "Constrained Solid-State Foaming of Microcellular Panels," Cellular Polymers 24(2):71-90, 2005.

Otsuka, T., et al., "Nanocellular Foams of PS/PMMA Polymer Blends," Macromolecular Materials and Engineering 293(1):78-82, Jan. 2008.

Yokoyama, H., and K. Sugiyama, "Nanocellular Structures in Block Copolymers With $CO_2$-philic Blocks Using $CO_2$ as a Blowing Agent: Crossover From Micro- to Nanocellular Structures With Depressurization Temperature," Macromolecules 38(25):10516-10522, Dec. 2005.

Zhang, S.S., "A Review on the Separators of Liquid Electrolyte Li-Ion Batteries," Journal of Power Sources 164(1):351-364, Jan. 2007.

Zhou, C., et al., "Fabrication and Characterization of Polyetherimide Nanofoams Using Supercritical $CO_2$," Journal of Cellular Plastics 48(3):239-255, Apr. 2012.

* cited by examiner

METHOD TO PRODUCE NANOPOROUS POLYMERIC MEMBRANES

CROSS-REFERENCE TO RELATED APPLICATION

This application claims the benefit of U.S. Provisional Application No. 61/783,951, filed on Mar. 14, 2013, the disclosure of which is incorporated herein in its entirety by reference.

BACKGROUND

The traditional solid-state foaming process is a well-characterized method of producing microcellular thermoplastic foams. This process has been applied to a variety of crystalline and amorphous polymers, including polystyrene (PS), polycarbonate (PC), and polyethylene terephthalate (PET). Cell nucleation is achieved by a rapid reduction in the gas solubility of the polymer by the introduction of heat and/or rapid depressurization.

Further developments in the solid-state process have sought to produce polymer foams with cells in the sub-micron range. Reducing the cell size of polymer foams is a significant goal due to predicted improvements in the strength-to-weight ratio, toughness, and thermal insulation. Some methods of reducing the cell size have included the use of nanocomposite additives as nucleation sites, the foaming of polymer blends with nanoscale domains, and the use of specialized block copolymers with $CO_2$-philic blocks.

This disclosure relates to a method for producing foams having nanoscale features that are suitable to be used as battery separators in cells.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The production of nanofoams in polyetherimide (PEI) using supercritical carbon dioxide is disclosed. Polymers were foamed in a hot press in order to ensure flatness and planarity. The resulting polymer foams can be machined to a certain thickness allowing the use as battery separators, or other ion exchange membranes, for example.

In some embodiments, a method for making a flat, blister-free foam with an open, interconnected cellular structure, includes: saturating a solid-state polymer with a non-reacting gas in a vessel at conditions wherein the gas is supercritical and producing a gas-saturated solid-state polymer; placing the gas-saturated, solid-state polymer at atmospheric pressure and temperature to partly desorb gas; placing the partly desorbed, gas-saturated, solid-state polymer in a press; in the press, heating the partly desorbed, gas-saturated solid-state polymer at a temperature effective to allow polymer chains to move in relation to one another and allow gas to nucleate into cells and grow, without melting the polymer, while the press applies a clamping force that constrains the polymer in a thickness dimension, and produces a foam; and removing a solid skin layer on exterior surfaces of the foam and creating an open interconnected cellular structure throughout a thickness of foam.

In some embodiments, the gas-saturated polymer is desorbed in atmospheric pressure for about 35 minutes.

In some embodiments, the partly desorbed, gas-saturated solid-state polymer is heated in the press for about 3 minutes or greater.

In some embodiments, the polymer is a thermoplastic polymer.

In some embodiments, the polymer is polyetherimide.

In some embodiments, a pressure inside the vessel is at or greater than a critical pressure of carbon dioxide of 7.39 MPa.

In some embodiments, a temperature inside the vessel is at or greater than a critical temperature of carbon dioxide of 31.1° C.

In some embodiments, the clamping force is 1 ton (imperial) or less.

In some embodiments, the effective temperature is 165° C. to 175° C., 175° C. to 185° C., 185° C. to 195° C., or 195° C. to 205° C.

In some embodiments, the solid-state polymer is about 100% by weight polyetherimide.

In some embodiments, the polyetherimide has the formula

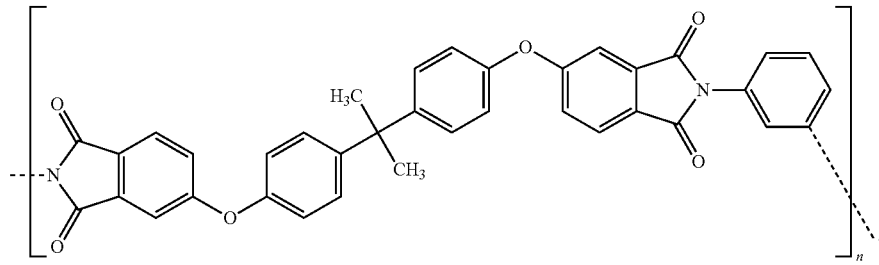

In some embodiments, the foam includes an open interconnected nanocellular structure throughout a thickness of the foam, wherein the cellular structure comprises cells having a characteristic diameter of 100 nm or less, and the foam thickness is about 30 μm or less.

In some embodiments, the characteristic diameter is 50 to 100 nm.

In some embodiments, the method includes polishing the foam to remove a skin layer.

In some embodiments, the method includes polishing the foam to remove a skin layer and a transition layer comprising a microcellular structure.

In some embodiments, a battery cell includes a foam made by the process of any one of the above embodiments; and placing the foam between a cathode and anode to assemble a battery cell.

In some embodiments, a polymer foam includes a unitary flat foam material having an open interconnected nanocellular structure throughout a thickness of the foam, wherein the cellular structure comprises cells having a characteristic diameter of 100 nm or less, and the foam thickness is about 30 µm or less.

In some embodiments, the characteristic diameter is 50 to 100 nm.

In some embodiments, the polymer foam is about 100% by weight polyetherimide.

In some embodiments, a battery separator includes the polymer foam of anyone of the above embodiments.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
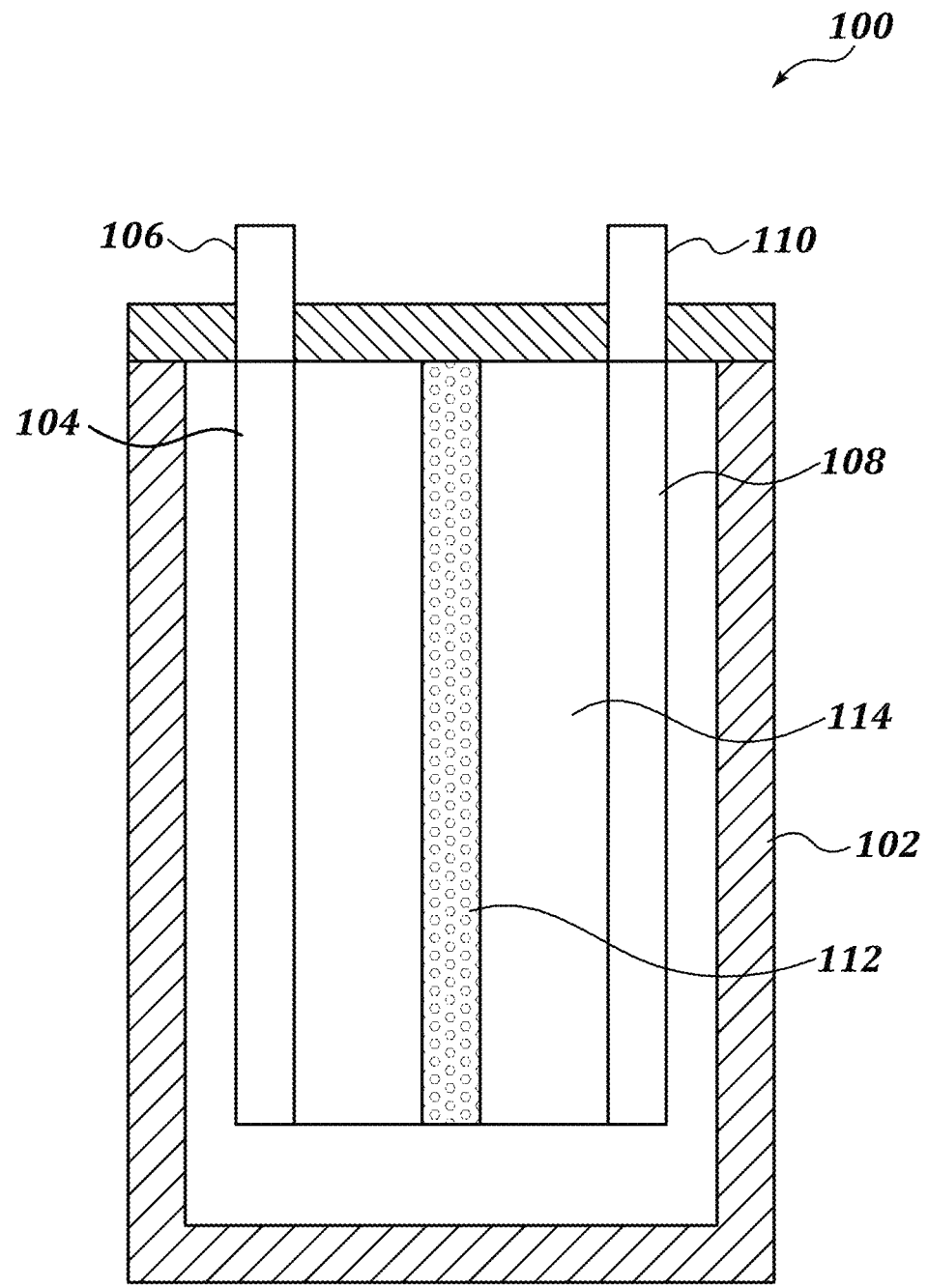
FIG. 1 is a diagrammatical illustration of a battery cell.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from *Webster's Dictionary,* 3$^{rd}$ Edition, or a dictionary known to those of skill in the art, such as the *Oxford Dictionary of Biochemistry and Molecular Biology* (Ed. Anthony Smith, Oxford University Press, Oxford, 2004).

As used herein and unless otherwise indicated, the terms "a" and "an" are taken to mean "one," "at least one" or "one or more." Unless otherwise required by context, singular terms used herein shall include pluralities and plural terms shall include the singular.

Unless the context clearly requires otherwise, throughout the description and the claims, the words 'comprise,' 'comprising,' and the like are to be construed in an inclusive sense as opposed to an exclusive or exhaustive sense; that is to say, in the sense of "including, but not limited to." Words using the singular or plural number also include the plural and singular number, respectively. Additionally, the words "herein," "above," and "below," and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

All of the references cited herein are incorporated by reference. Aspects of the disclosure can be modified, if necessary, to employ the systems, functions, and concepts of the above references and application to provide yet further embodiments of the disclosure. These and other changes can be made to the disclosure in light of the detailed description.

Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

This disclosure is related to the production of flat (planar), nanoporous PEI sheets using supercritical carbon dioxide. Such nanofoams may be used in filtration and ion exchange applications. Processing conditions are disclosed that can reliably produce flat, nanocellular foams without internal blisters. This disclosure provides ranges for desorption time, gas concentration, foaming time, foaming pressure, clamping force, and foaming temperature. Desorption time strongly affects the development of internal blisters and the size of the resulting transition layer. Blister free samples may be obtained under the stated conditions with desorption equal to or longer than 35 minutes. Increased foaming time increases the resultant cell size and relative density, but can eliminate the curvature found in samples foamed for shorter times. Finally, the foaming temperature significantly affects the nanostructure of the foam. Several morphologies have been observed solely through changes in the foaming temperature.

The present disclosure also relates to the use of nanoporous foams produced via solid-state foaming as battery separators. Battery separators are permeable membranes placed between the anode and the cathode of an electrolyte battery cell. The battery separator prevents physical contact between the anode and the cathode while allowing ionic transport through the electrolyte. A battery separator should be thin, porous, strong, and chemically resistant. In addition, it is desirable for the porous structure to be uniform and highly tortuous to inhibit the growth of lithium dendrites through the structure, which cause short circuits and battery failure.

Referring to FIG. 1, a diagrammatical illustration of battery cell 100 is illustrated. The particulars of the battery are not illustrated in detail. Batteries may be constructed using stacked cells, spiral wound cells, button cells, and the like. However, generally all electrolyte batteries include a cathode plate 106 and anode plate 108, separated by a battery separator 112. The battery cell 100 also includes an electrolyte 114. The cathode 106 and anode 108 are in contact with the electrolyte 114. The battery separator 112 is interposed between the cathode and anode plates to prevent them from short circuiting, but allows ions to flow between the plates. Typically, battery cells can be categorized by the materials used for the plates, such as zinc/carbon, nickel/cadmium, nickel-metal hydride cells, and lithium ion cells, such as lithium cobalt oxide, lithium iron phosphate, and lithium manganese oxide. Other materials will be known to those skilled in the art. Similarly, suitable electrolytes to be used with each category of cell will be known to those skilled in the art. Conventional battery separators are also known and can be made from natural fibers, such as cotton, minerals, such as glass, synthetic polymers, such as nylon, polyester, polyethylene, polypropylene, polyvinyl chloride, to name a few. The battery separator can be made from fibers as a woven or nonwoven material, or from a polymer film. Disclosed herein is a method for making and using foams made via the solid-state foaming process as a battery separator. The foam battery separator should be chemically compatible with the materials of construction and the electrolyte. A suitable thickness of the foam battery separator is in the range of about less than 30 μm, preferably about or less than 25 μm. However, the thickness may be dictated by the particular battery. As described herein, foams made using a supercritical gas will produce open-celled foams having nano-sized porous features that allow passage of ions across the separator. A suitable pore size is about 1 μm or less. The foam battery separator can have mechanical strength in terms of tensile strength, puncture strength, and tear resistance, to withstand the manufacturing process. Battery separators are thin to maximize the energy density of the resulting battery. In practice, battery separators typically have a thickness of 25.4 μm (1 mil) or less.

The solid-state foaming process is suited to the production of uniform, highly tortuous open porous structures with pores less than 1 μm in diameter. In addition, this process can be applied to a variety of polymers with excellent thermal and mechanical properties and chemical resistance. Suitable polymers may include, but are not limited to, thermoplastic urethane, thermoplastic elastomer, polyethylene naphthalate, polyetherimide, polyetheretherketone, polyphenylene, sulfone, polyamide-imide, polysulfone, polyphenylsulfone, polyethersulfone, polyphthalamide, polyarylamide, polyphenylene sulfide, cyclic olefin copolymer, polyphthalate carbonate, polycarbonate, polyvinylidene chloride, polyurethane, polyphenylene oxide, poly(acrylonitrile-butadiene-styrene), polymethylmethacrylate, crosslinked polyethylene, polystyrene, styrene acrylonitrile, polyvinyl chloride, polybutylene terephthalate, polyethylene terephthalate, polyoxymethylene, polyacetal, polyamide, polyolefin, polyethylene, polypropylene.

The solid-state foaming process may result in the creation of a noncellular structure on the exterior, called a "skin." In order to avoid the nanoporous foam being locked within a solid exterior skin layer and blocking ionic transport, a solid-state process may be adapted to directly produce thin porous membranes with no solid skin layer. This can involve elimination of desorption from the polymer prior to foaming via in situ foaming. In situ foaming is a variation of the solid state process, where foaming step takes place inside the vessel where saturation of the gas occurs. This is done to reduce the desorption of gas that would result in an exterior noncellular skin layer.

As an alternative to in situ foaming, the solid skin may be removed mechanically or chemically. Accordingly, disclosed is a solid-state foaming method further including a step for removing the solid skin surrounding a foam and for reducing the thickness to the desired amount. A blister-free foam having a flat or planar surface and a nanoporous structure that may extend throughout the thickness of the foam that may be used as a battery separator, is disclosed.

Figure 2:
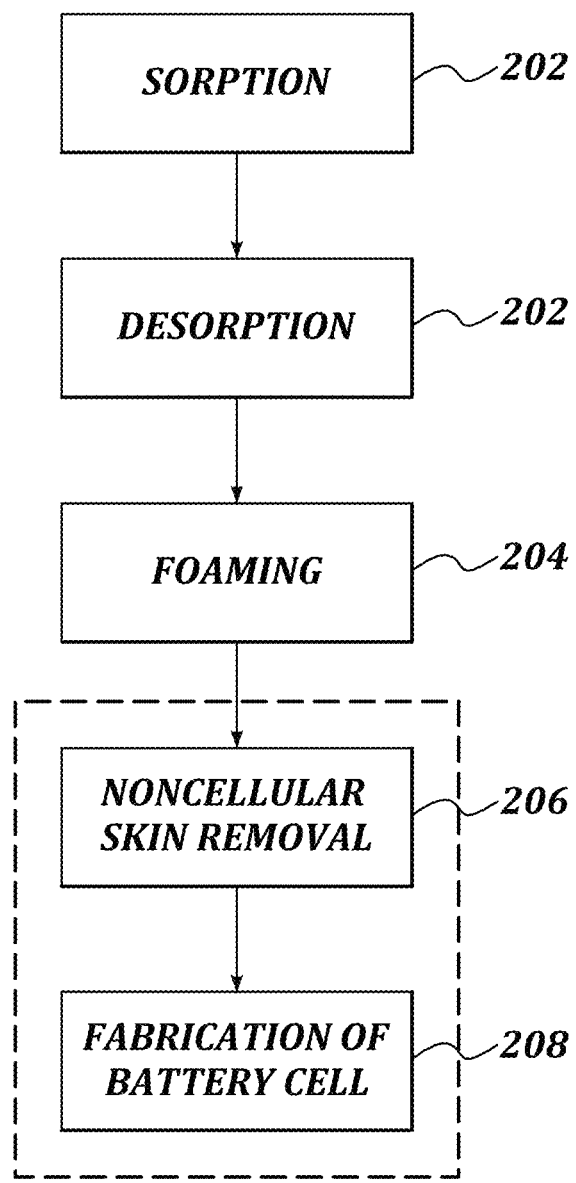
FIG. 2 is a flow diagram of a solid-state foaming method in accordance with one embodiment.

The solid-state foaming process is distinguished from other foaming methods by nucleating cells in a polymer while the polymer remains in the solid state, as opposed to a polymer in a melt phase, such as done during extrusion. Referring to FIG. 2, a solid-state process includes mainly three steps: sorption 200 (or saturation), desorption 202, and foaming 204. In the sorption step 200, a solid noncellular polymer is exposed to high pressure gas, typically carbon dioxide. The gas may be inert or non-reacting with the polymer. Other gases may include nitrogen, or combinations of nitrogen and carbon dioxide. The polymer may initially be shaped as a thin film or sheet. The gas molecules diffuse into the polymer over time, until the polymer is fully saturated. The saturation concentration of each polymer-gas system depends on the pressure and temperature of the gaseous environment. In general, the saturation concentration is proportional to the pressure and inversely proportional to the temperature. The uptake of gas into the polymer is observed by measuring the increasing mass of the sample over time. In some embodiments, the pressure and temperature of the gas is adjusted at or greater than the critical temperature and pressure of carbon dioxide, respectively, 304.25 K and 7.39 MPa to provide a supercritical fluid. However, other embodiments may use different gases and the critical temperature and pressure will be different.

During saturation, the polymer may be wrapped in a porous material, such as paper or fabrics, to ensure even exposure to gas on all surfaces. During sorption, the gas diffuses from the surface of the polymer to the core, meaning that there is a distribution of gas concentrations within the polymer, with the lowest values at the core. As diffusion progresses, the concentration distribution approaches a steady state value throughout the polymer. Typically, the sorption step lasts until the polymer is fully saturated.

In the desorption step 202, the polymer is removed from the pressure and temperature controlled environment and exposed to room temperature and pressure. Under these conditions, the saturation concentration is drastically reduced, rendering the polymer supersaturated. As a result, the absorbed gas diffuses back out of the solid polymer to the surrounding air. Thus, the gas concentration profile will be lowest at the edges and exterior surfaces of the polymer. The extent of desorption can be controlled by the time during which it occurs, and the temperature and pressure conditions that it occurs at.

The foaming step 204 involves nucleating the absorbed gas into cells within the solid polymer. This is achieved by rapidly raising the temperature of the solid gas-saturated polymer. Increasing the temperature further supersaturates the already gas-saturated polymer. The temperature is raised above its glass transition temperature ($T_g$) of the polymer-gas system. The $T_g$ is the temperature at which an amorphous or semicrystalline gas-polymer system undergoes a transition from a relatively hard and brittle state to a soft and rubbery state. At a molecular level, this phenomenon can be understood as the presence of enough energy at temperatures above the $T_g$ being present to allow the polymer chains to move in relation to one another. This polymer chain mobility allows the dissolved gas to nucleate into cells and grow, with the polymer chains rearranging themselves around the cells. The temperature at which the transition occurs depends on the polymer and the amount of gas dissolved in it. The dissolved gas acts as a plasticizer in the solid polymer, lowering the glass transition temperature of the neat polymer. Despite the glass transition, the polymer is still considered to be in a solid state throughout the foaming process. The temperature is not raised to the melt temperature of the polymer. The temperature to achieve nucleation and foaming can be determined experimentally by conducting tests on gas-saturated polymers having different gas concentrations.

The heating step, i.e., foaming step, can be carried out via an oil bath or a heated press. In oil bath heating, the gas-saturated polymer is submerged in a circulating bath of oil held at a particular temperature, called the foaming temperature. After a set amount of time, referred to as the foaming time, the cellular polymer is removed and allowed to cool in air or is quenched in water. When using a heated press, the gas-saturated polymer is placed between the heated platens of a compression press, such as one that may be activated hydraulically. The heat of the platens foams the sample while also applying a clamping force on the polymer as it foams to maintain flatness. The foamed polymer may be released and cooled in air or cooled under pressure in the press.

Representative starting materials for PEI nanofoams for use as battery separators include commercially available sheets of PEI. Representative thickness dimension of the sheet is 1.016 mm (0.040 inches). The sheets have an initial glass transition temperature of 217° C., a density of 1.27 g/cm³, and a melt temperature of 350-400° C. While PEI is described as a representative material, other materials may be used, including polyester, polyethylene, polypropylene, polyvinyl chloride, and other polymers known to be used as battery separators. PEI is an amorphous thermoplastic with excellent mechanical strength and chemical resistance, so other similar polymers may also produce satisfactory results. The mechanical properties of PEI are stable and predictable up to 200° C. PEI resin is translucent amber in color and turns white when foamed. A suitable commercially available PEI is known under the designation Ultem 1000. The material may be obtained from McMaster-Carr as 0.040" (1.016 mm) sheets.

A thick PEI sheet cannot be reliably cut using scissors, so a foot-operated shear was used to cut samples into 1.016×45× 45 mm squares. Other cutting methods were experimented with, including hand shears and a band saw. The band saw can lead to significant cracking of the edges of the samples. Both methods of shearing can leave a crimped edge on the sample. However, the crimped edges did not appear to affect the resulting foam. PEI may be foamed without prior drying.

Referring to FIG. 2, block 200, the saturation of the solid noncellular flat polymer can be performed with gas at an elevated pressure. For example, a suitable saturating gas is 99.9% by weight carbon dioxide. The saturation pressure, temperature, and time can be varied to control the resulting gas concentration of each sample. During sorption, the polymer may be individually wrapped in paper before saturation to ensure even exposure to the gas.

In block 200, the temperature and pressure conditions were set to result in supercritical carbon dioxide. For carbon dioxide, the critical temperature and pressure are 304.25 K and 7.39 MPa. However, higher pressures and temperatures may be used. The system used for sorption in block 200 may include a high-pressure vessel. A gas booster device uses compressed air to drive a pump that pressurizes the vessel above to the desired pressure for sorption. The pressure vessel may also have a heating unit connected to a temperature controller unit. This unit uses a thermocouple located on the inside of the vessel to monitor the saturation temperature. The system may be used for saturating the polymer at about 20

MPa and about 45° C. However, other pressures and temperatures may be used above the supercritical pressure and temperature of the respective gas.

The extent of gas uptake in the polymer is measured by comparing the change in mass. Mass measurements can be taken using any suitable balance, for example, a balance having an accuracy of 10 μg. In order to measure the concentration of gas in the polymer during sorption, the polymer is removed from the pressure vessel and measured on the balance at ambient pressure. During this time, gas may desorb from the polymer. This may contribute to the error in gas concentration measurement. The longer the polymer desorbs before measuring the concentration, the more error will be introduced. Larger polymer samples will lose a smaller percentage of the total dissolved gas and thus exhibit less error in concentration measurement. Small or very thin polymer samples with a high surface area to mass ratio can show significant errors in concentration measurement. After measurement, the polymer samples are returned to the pressure vessel and again exposed to high pressure. The gas concentration in the polymer is reported as a mass percent by the following equation.

$$C = \frac{m - m_{initial}}{m_{initial}} \times 100 \qquad (2.1)$$

Figure 3:
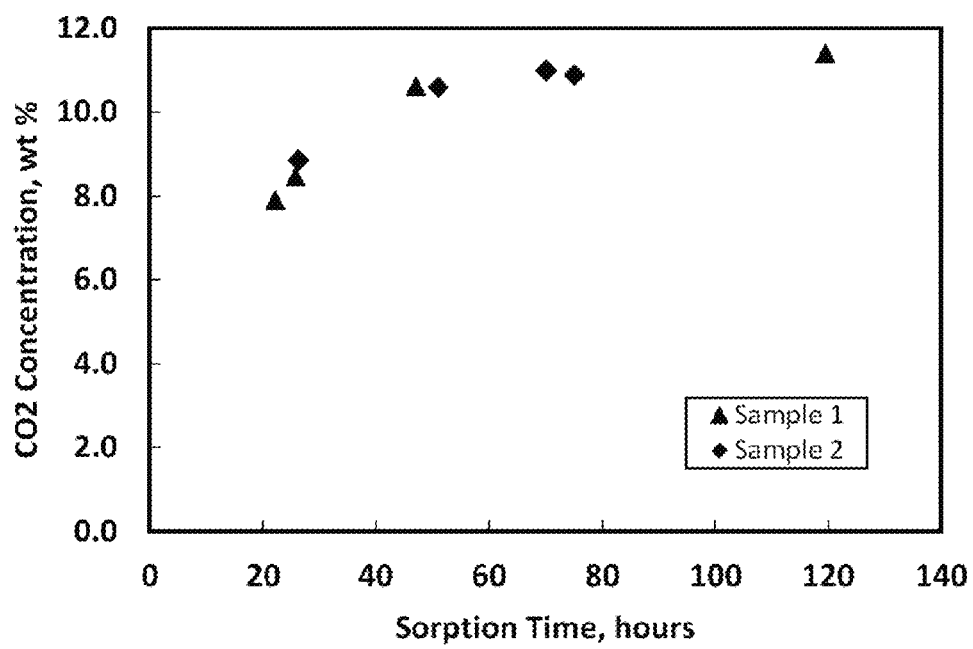
FIG. 3 is a graph showing carbon dioxide sorption at 20 MPa and 45° C.
Figure 4:
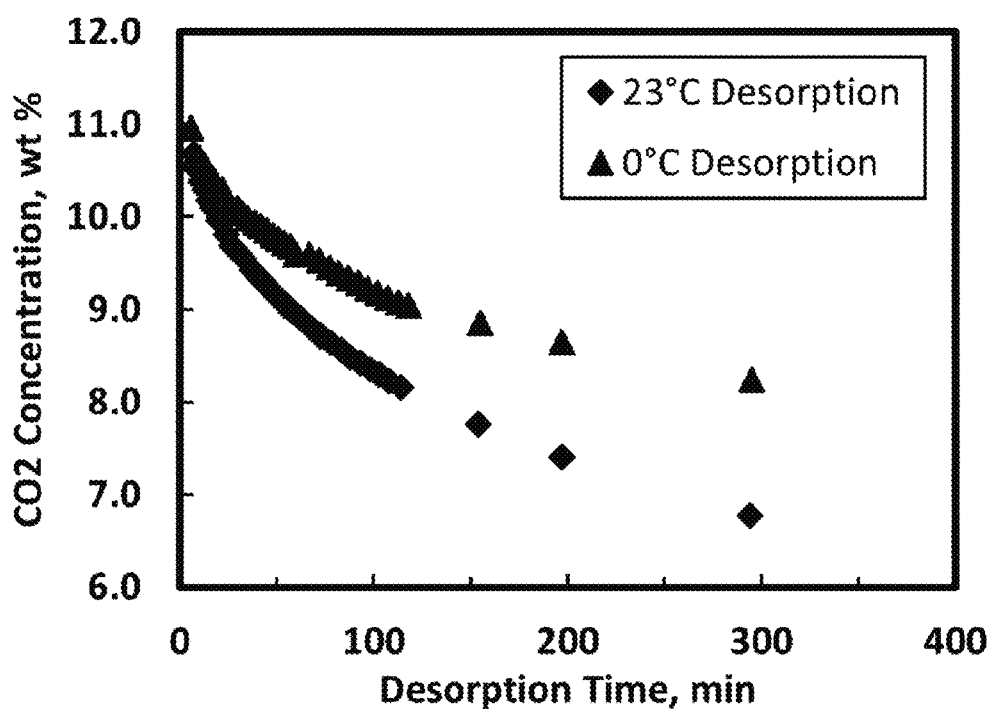
FIG. 4 is graph showing carbon dioxide desorption at room temperature.

FIG. 3 shows the concentration of carbon dioxide gas dissolved into PEI samples at 20 MPa and 45° C. Measurements were taken approximately 2 minutes after pressure release, and thus reflect some desorption of gas from their initial state. PEI can be considered saturated after 72 hours of sorption, which results in a final concentration greater than 11% by weight. FIG. 4 shows the measured desorption behavior of two saturated PEI samples, desorbed at room temperature and 0° C. Once graphs representing sorption and desorption are created for a particular polymer and gas at a given temperature and pressure, one need only rely on the time to know when the polymer is considered to be fully or nearly fully saturated and how much desorption time will result in an allowable concentration.

Figure 5:
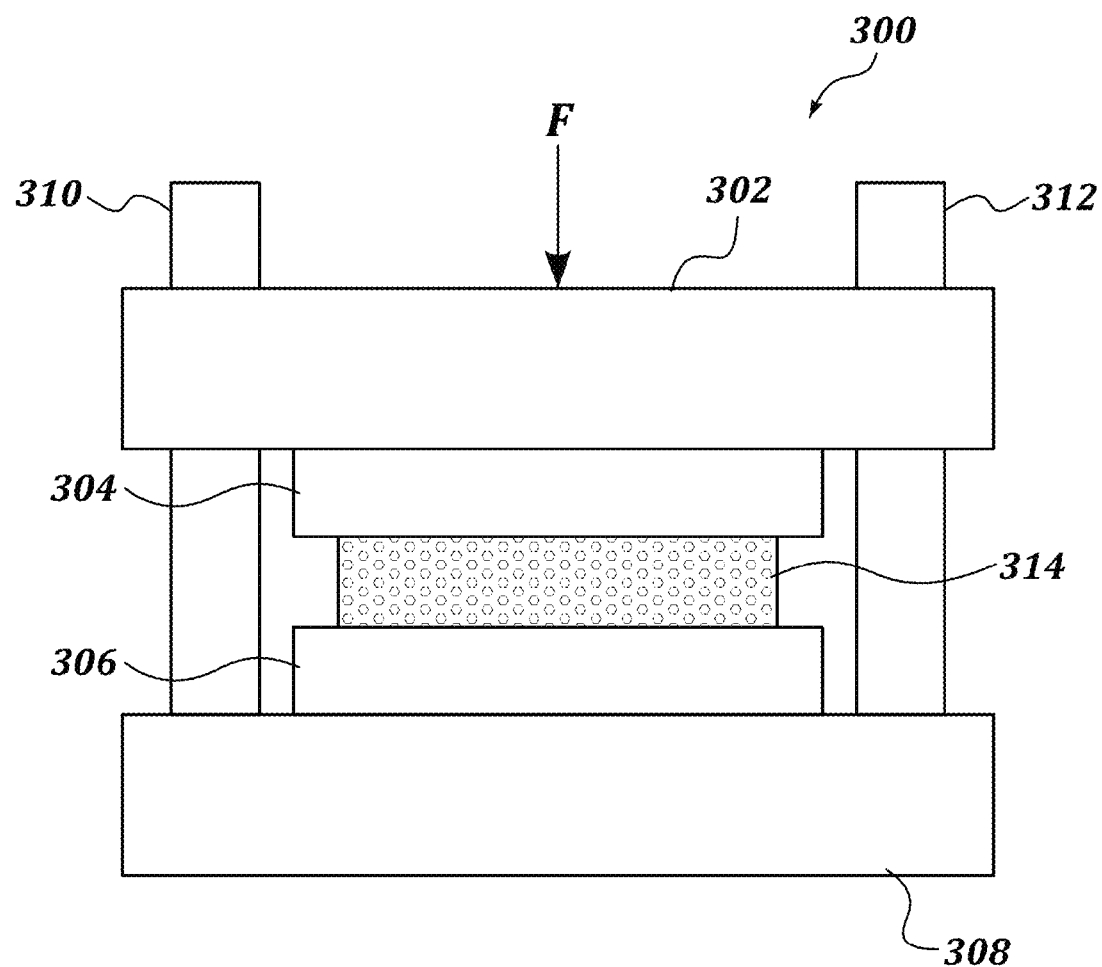
FIG. 5 is a diagrammatical illustration of a press.

Once a polymer has been saturated with carbon dioxide, and optionally desorbed, a heating step is employed to nucleate the dissolved gas into cells. Several methods of introducing heat to saturated samples may be used. Oil bath foaming provides a fast and controllable heat source but is limited by temperature constraints and produces curved samples. Press foaming can produce flat, evenly foamed samples. When using a heated press as the source of heat, porous fabric layers may be interposed between the top and bottom sides of the polymer and the top and bottom platens to allow gas to escape. Referring to FIG. 5, a diagrammatical illustration of a hydraulic press 300 is illustrated. The press 300 includes an upper structural plate 302 and a lower structural plate 304. An upper platen 304 is attached to the underside of the upper plate 302, and a lower platen 306 is attached to the upper side of the lower plate 308. The press 300 may include first and second guiding rods 310, 312. The press 300 may include a hydraulic cylinder (not shown) that presses the upper plate and platen toward the lower plate and platen in the direction of the "F" arrow. The platens apply a clamping force that constrains the foam polymer 314 in the thickness dimension, such that one side of the foam polymer 314 lies flat with the upper platen 304, and the opposite side of the foam polymer 314 lies flat with the lower platen 306. The upper platen 304 and the lower platen 308 may have internal heating elements and temperature sensing devices to control and measure the temperature of the platens, 304, 308. The gas-saturated polymer is placed between the lower platen 308 and the upper platen 304. Fabrics may be placed between the polymer and the platens to allow gas to escape and to facilitate release. When referring to clamping force, the units are in tons.

Figure 6:
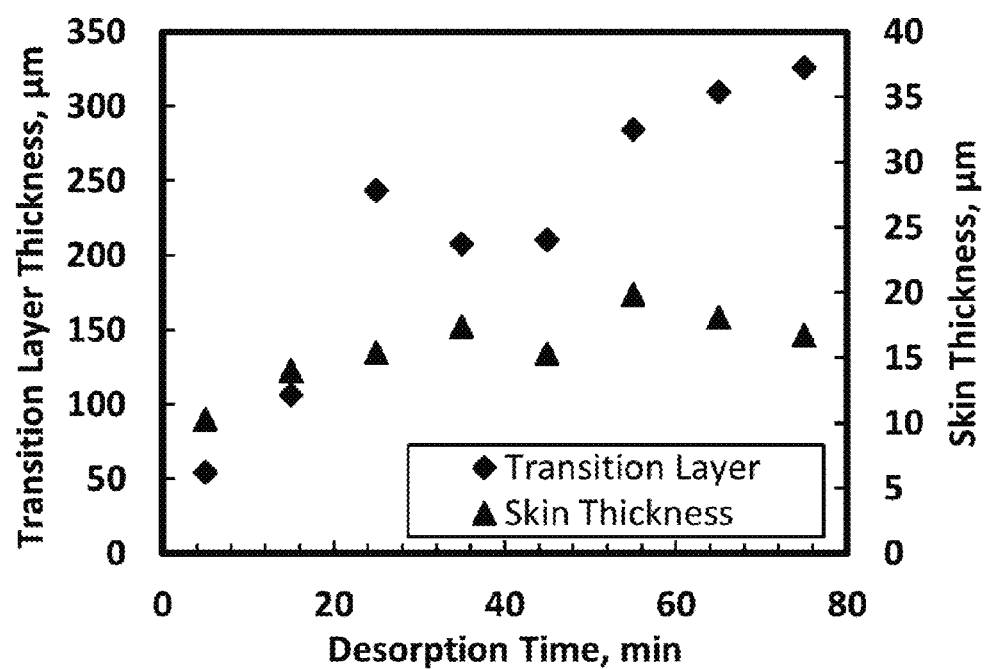
FIG. 6 is a graph showing growth of solid skin and transition layer thickness with longer desorption times.
Figure 7A:
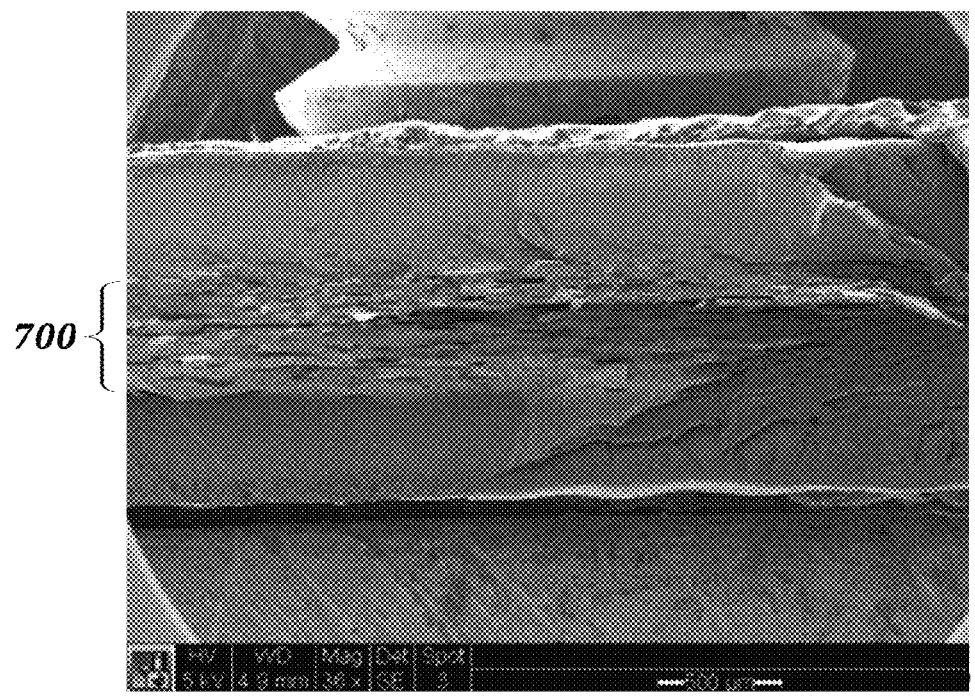
FIGS. 7A and 7B are SEM images of foams when the desorption time was varied between 15 minutes and 75 minutes.
Figure 7B:
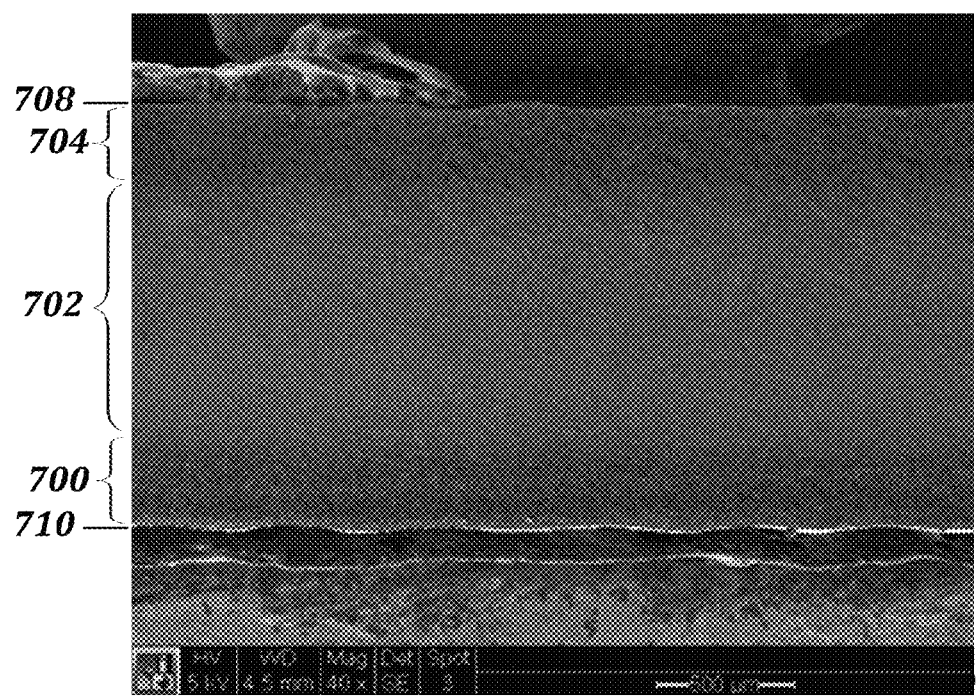

After saturation, the gas-saturated polymers can be desorbed at room temperature and atmospheric pressure for a set amount of time, in block 202. As described herein, the amount of desorption can affect the foam characteristics. In particular, a significantly higher rate of internal blistering may occur at lower desorption times. The internal blisters can form around the mid-plane of the polymer sheet and expand perpendicularly to the clamp pressure. In extreme cases, the internal blisters can join and separate the sample into two halves attached only at the edges. FIG. 6 shows the results of varying desorption time prior to foaming the sample in the press between 5 and 75 minutes under conditions when the platen temperature is 195° C., the clamping pressure is 0.5 tons, and the heating time is 3 minutes. The solid skin remains between 10-20 μm thick, while the transition layer grows steadily from 54 to 326 μm. This effect is due to the diffusion of carbon dioxide out of the sample. The locally lower gas concentration near the surface leads to the development of fewer and larger cells. Thus, more desorption leads to a thicker transition layer. FIGS. 7A, 7B show SEM images of two samples foamed after different desorption times. FIG. 7A shows a foam created from a polymer that had less than 35 minutes of desorption time (15 minutes), which contained considerable internal blistering 700. FIG. 7B shows a foam from a polymer that had 35 or more minutes of desorption time (75 minutes), and contained no internal blisters but had thicker transition layers.

After desorption, in block 204, the gas-saturated polymers can be placed between the upper and lower platens, which have been preheated to the desired foaming temperature. To allow gas to escape between the surface of the polymer and the platen, one to four layers, for example, of PTFE-coated fiberglass fabric may be interposed therebetween. The top and bottom layers of fabric are tightly woven fiberglass intended to allow for easy release from the platens. The fabric immediately adjacent to the polymer has a porous, open weaving that allows for excess carbon dioxide from the polymer to be released during foaming. This can reduce the formation of surface blisters on the polymer during foaming. The hot press is set to close rapidly until it reaches an adjustable point, set to be just thicker than the unfoamed polymer. At this point it closes slowly on the polymer and raises the pressure up to a set point (the clamping force). The press maintains this pressure and the desired platen temperature for a set foaming time, after which the platens open and the foamed polymer is promptly removed. The foamed polymer can be allowed to cool at room temperature.

Figure 8:
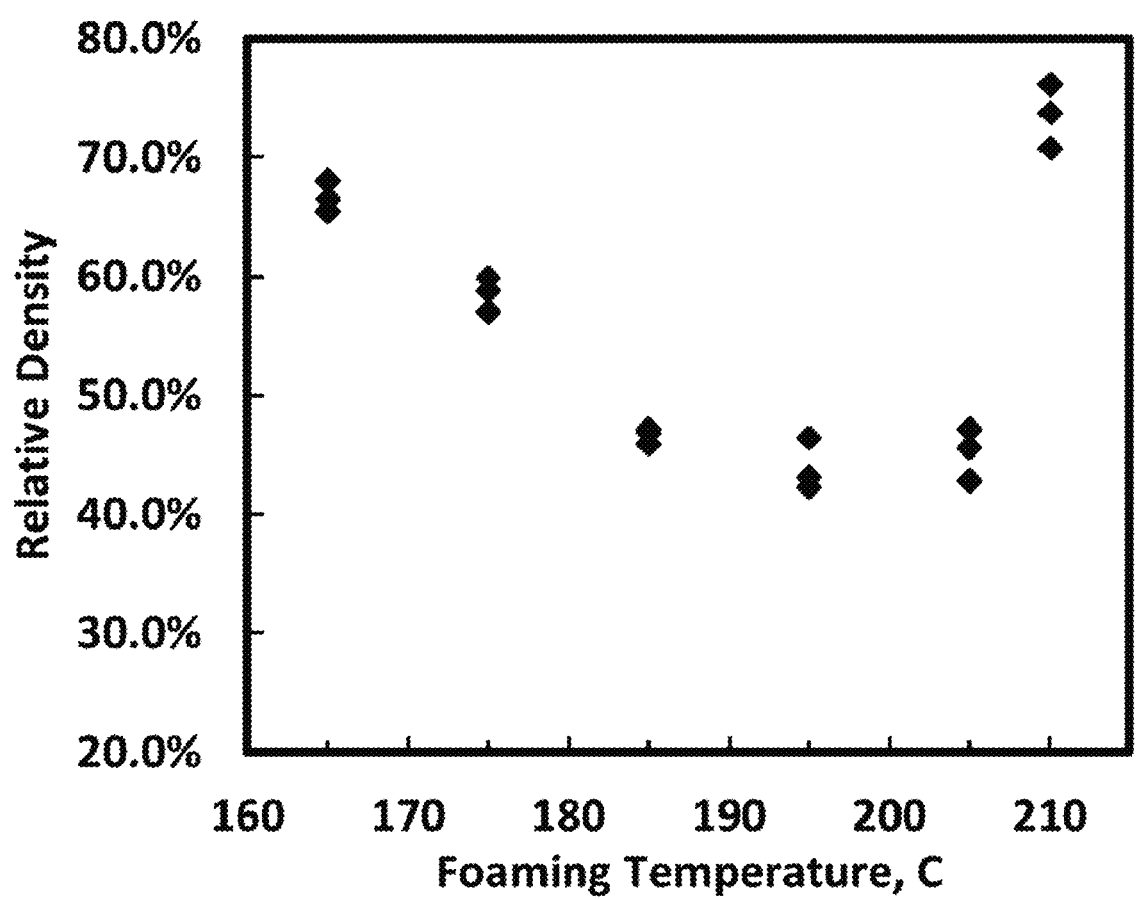
FIG. 8 is a graph showing foaming temperature versus relative density.
Figure 9A:
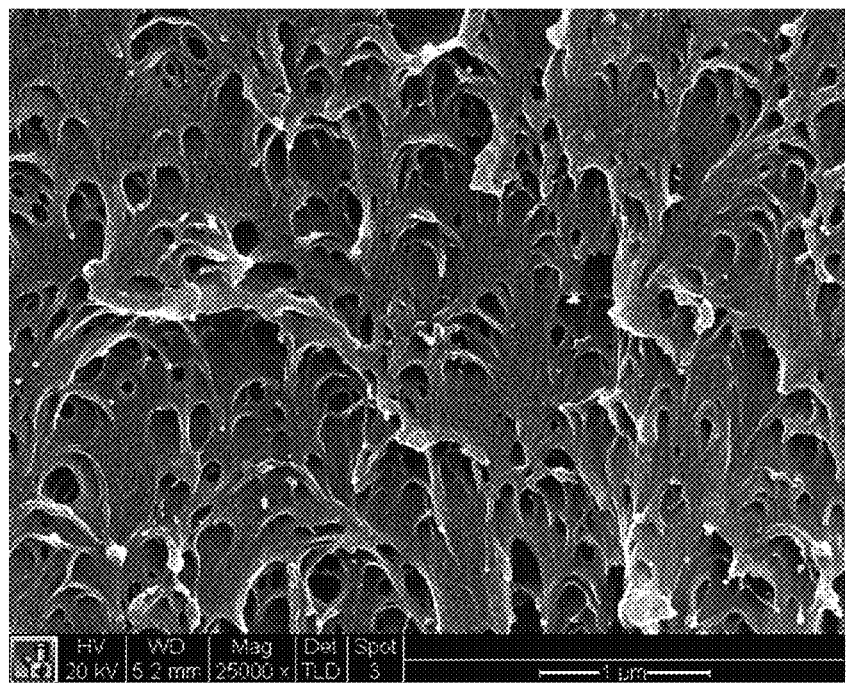
FIGS. 9A and 9B are SEM images of samples foamed at 165° C. and 195° C., respectively.
Figure 9B:
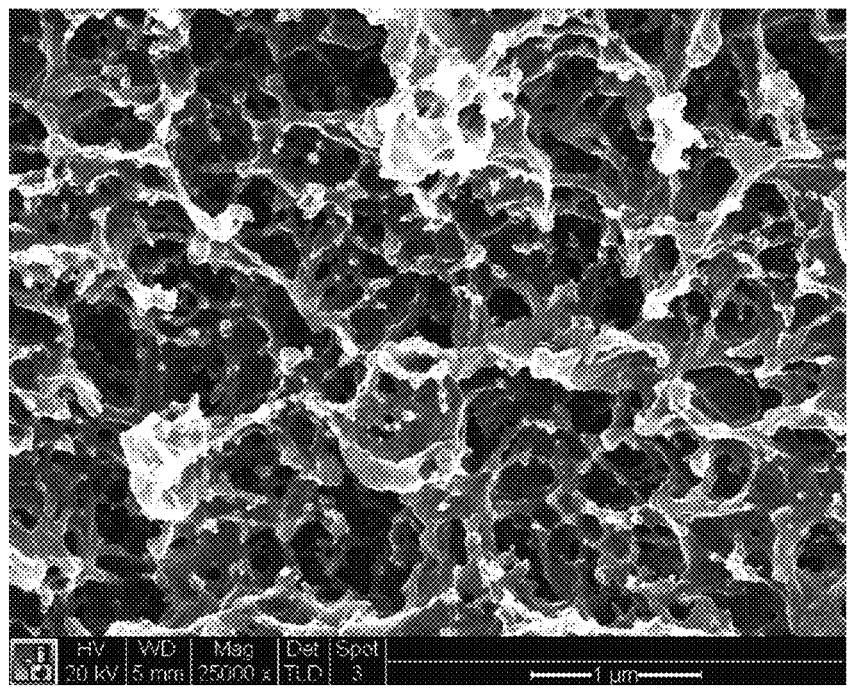

The platen temperature can influence the foam. At a clamp force of 0.5 ton, a foaming time of 3 minutes, and a desorption time can be 60 to 90 minutes prior to foaming, the effects of the platen temperature can be seen in FIG. 8. The relative density decreases with increasing foaming temperature until reaching a lower limit of 43.9% at 195° C. The relative density rises between 205° C. and 210° C. This effect is likely due to collapse of the cellular structure under the hot press force and temperatures near the glass transition. The samples foamed at 210° C. were significantly reduced in thickness after foaming, while all others gained thickness. FIG. 9A illustrates the cellular structures obtained at 165° C., and FIG. 9B illustrates the cellular structure obtained at 195° C. FIG.

Figure 13A:
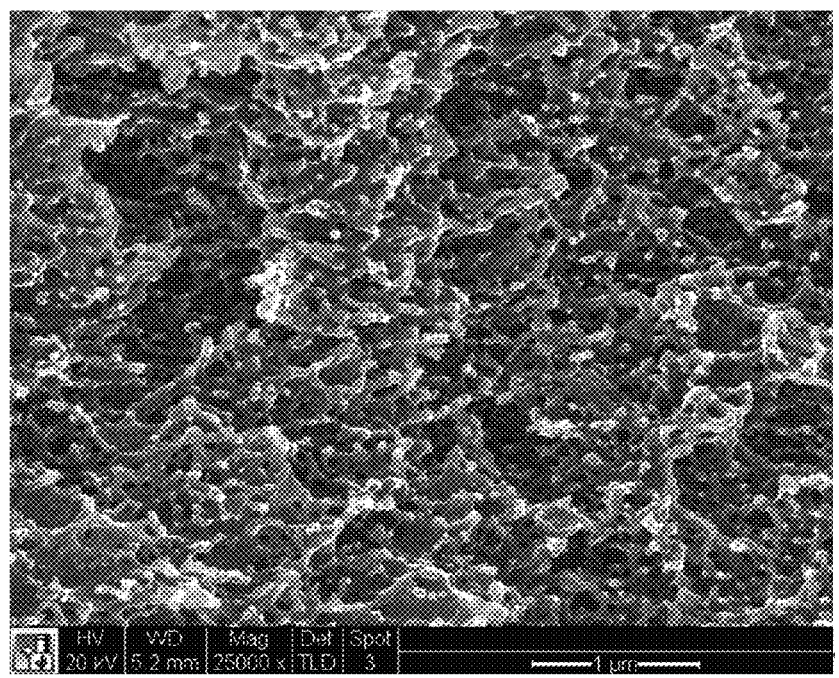
FIGS. 13A and 13B are SEM images of foam samples foamed at 205° C. and 210° C., respectively.
Figure 13B:
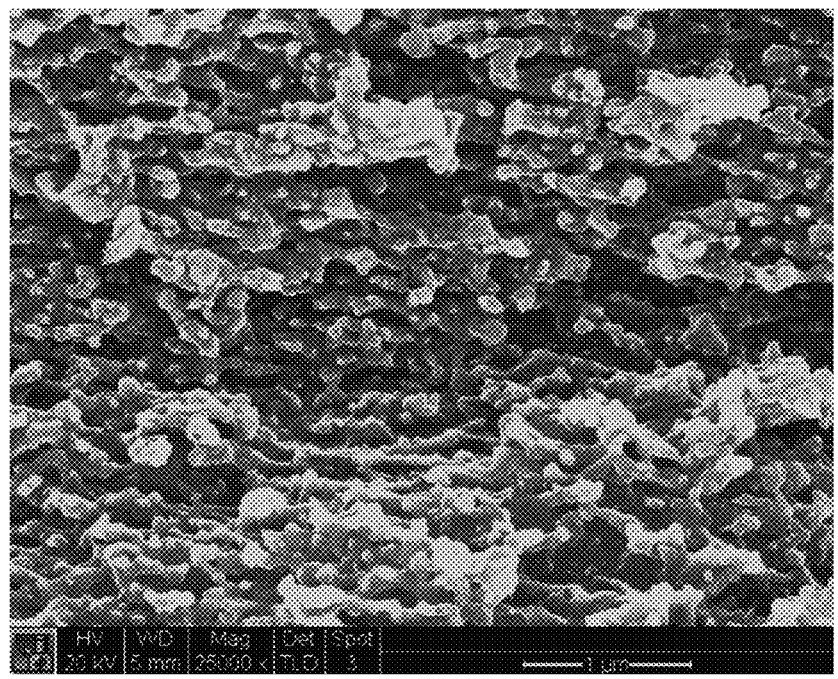

13A illustrates the cellular structures obtained at 205° C., and FIG. 13B illustrates the cellular structure obtained at 210° C.

Figure 10:
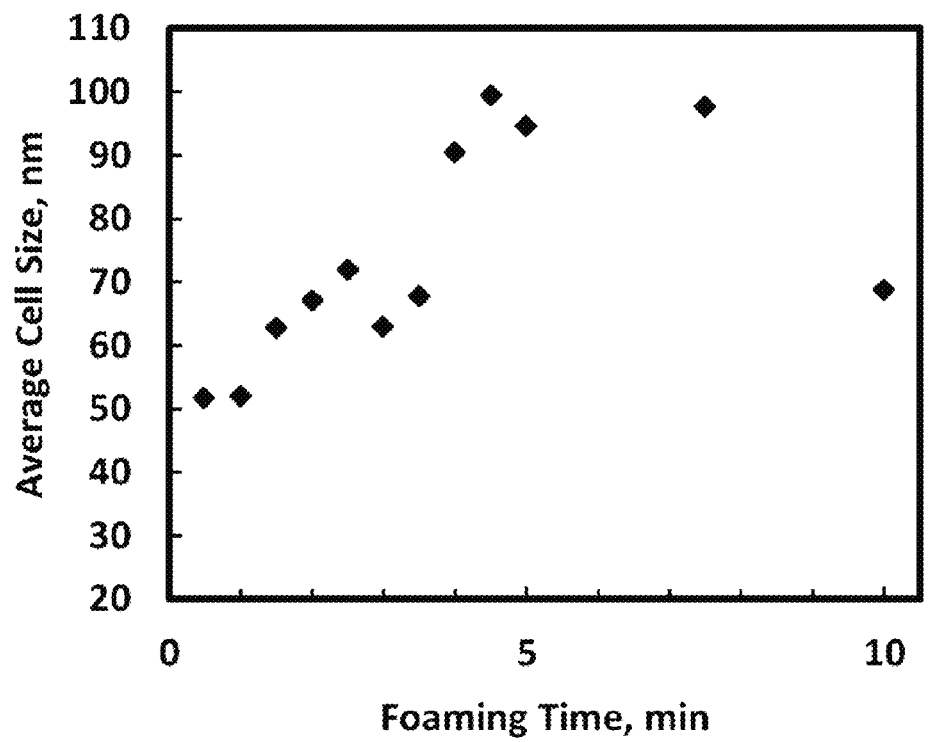
FIG. 10 is a graph showing foaming time versus average cell size.
Figure 11:
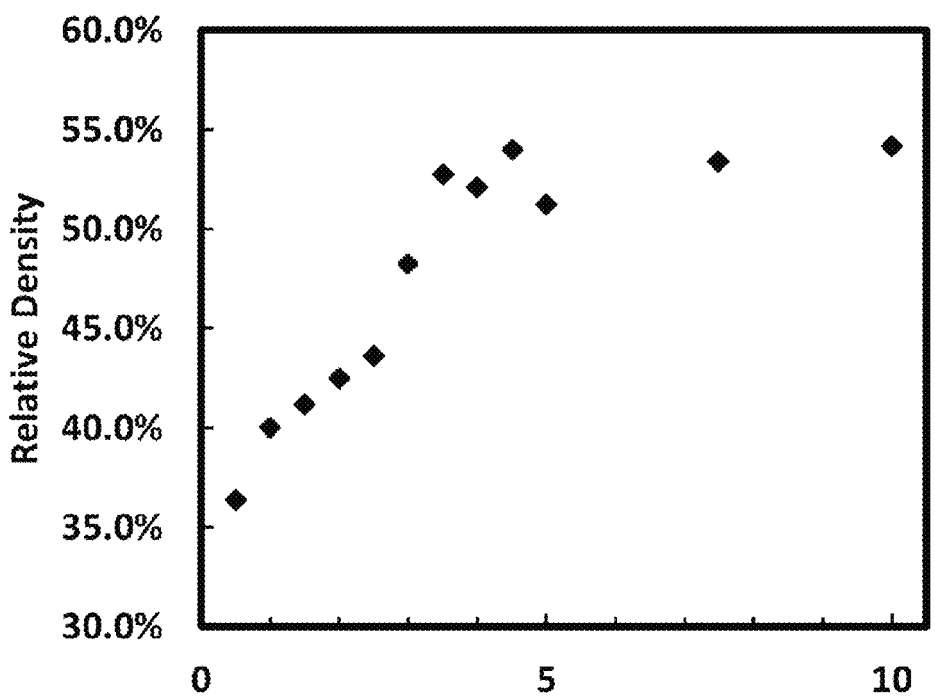
FIG. 11 is a graph showing foaming time versus relative density.

The foaming time can influence the foam. At clamp force of 0.5 tons, a platen temperature of 195° C., and a desorption time is 60 minutes to 90 minutes, the effects of varying the foaming time can be seen in FIG. 10. The average cell size increases with longer foaming times. Conversely, FIG. 11 shows a clear trend of increasing relative density with increased foaming time. This is likely due to the clamping pressure not allowing free growth of the sample during foaming. The lowest average cell size achieved was 51.8 nm in a sample foamed for just 30 seconds, with a relative density of 36.4%. However, sample flatness is one of the key goals of this process. Samples foamed for less than 3 minutes had significant curvature, while all samples foamed for 3 minutes or longer were flat (planar). This may be due to the relaxation of internal stresses resulting from the foaming process that would otherwise cause warping upon cooling.

The foamed polymer can be characterized by its relative density using displacement measurements and by its microstructure using scanning electron microscopy. Thus a foam sample can be described by its ratio of polymer to voids and the size and nature of these voids.

The density of the foamed polymers can be determined according to ASTM standard D792. This method involves comparing the mass of the polymer in air to its mass while suspended in a fluid. Distilled water was used as the working fluid. The sample mass was first measured in its dry state three times to ensure consistency. The sample was then submerged in water, placed against the measurement apparatus, and the mass was measured again. It should be ensured that few to no air bubbles adhere to the surface. Air bubbles attached to the sample surface add buoyancy to the sample, thus introducing error to the final measurement. The density in this disclosure is reported as a relative density compared to that of solid PEI (1.27 g/cm$^3$).

Microstructure characterization was performed by analyzing Scanning Electron Microscope (SEM) images of the microstructure of the foams. SEM samples can be prepared by liquid nitrogen freeze fracture. Samples can be cut to a manageable size and notched at the desired fracture plane using a razor blade. The samples were then submerged in liquid nitrogen for at least one minute. Immediately after removal from the nitrogen, the samples were pulled apart at the fracture surface using pliers.

Some PEI samples showed anisotropic fracture behavior. Samples fractured along one direction showed jagged and curved fracture surfaces unsuitable for imaging. However, samples fractured using the same method, but in the orthogonal direction, showed flat and clean fracture surfaces ideal for imaging. This effect is likely due to anisotropic material properties caused by the extrusion process used to form the PEI sheets.

Fractured samples can be mounted in vertical sample holders with carbon tape connecting the fracture surface to the metal holder for charge dissipation purposes. The mounted samples can be sputter coated with Au/Pd for 60 seconds using an SPI Sputter Module Controller. An FEI Sirion SEM can be used to obtain images of the fracture surface. Low magnification images (<10000×) can be collected using the default high resolution detector with an accelerating voltage of 5 kV, a spot size of 3, and a working distance around 5 mm. Higher magnification images require the use of the ultra-high resolution detector at an accelerating voltage of 20 kV. The high resolution detector provides much clearer and higher contrast images of the sample nanostructure.

The SEM images can be characterized by skin thickness, transition layer thickness, and cell size. A cross-section of a typical foamed sample, such as that shown in FIG. 7B, shows a core of nanoscale cellular structure 702 with transition layers 704, 706 of micro-scale cells on the top and bottom, followed by a thin solid skin 708, 710 on the upper and lower exterior. These features are caused by locally reduced gas concentrations at the edges of the sample due to desorption. Skin thickness was measured by drawing ten lines perpendicular to the skin surface at even intervals along the image. The skin thickness is defined as the average distance along each line to the first cell encountered. The same procedure was used to estimate the thickness of the transition layer, though the interface between the transition layer and the nanocellular core is less distinct.

Nanocellular foams have an interconnected network of voids with no clearly measurable cells. A reported cell size is actually best described as the characteristic length of the nanoscale features. This number is highly dependent on the morphology of the nanostructure. Small changes in the processing parameters result in significant changes in nanostructure that makes objective cell size measurement difficult. The cell size can be measured using ImageJ, which is available from the National Institutes of Health. Cell size was measured as follows: first, the image was loaded into ImageJ and the scale was calibrated. Next, a grid was drawn on the image using the grid plugin. The grid makes it easier to avoid repeat measurements of cells. Then, the freehand selection tool was used to trace the outline of the selected cell and the area of the resulting selection was measured. In order to convert this area into a linear dimension, the cell was assumed to be spherical with the measured area representing the mid-plane of the sphere. Thus, the N measured areas are converted to characteristic diameters and averaged by the following equation:

$$d = \frac{\sum_{i=1}^{N} 2\sqrt{\frac{A_i}{\pi}}}{N}$$

Figure 12:
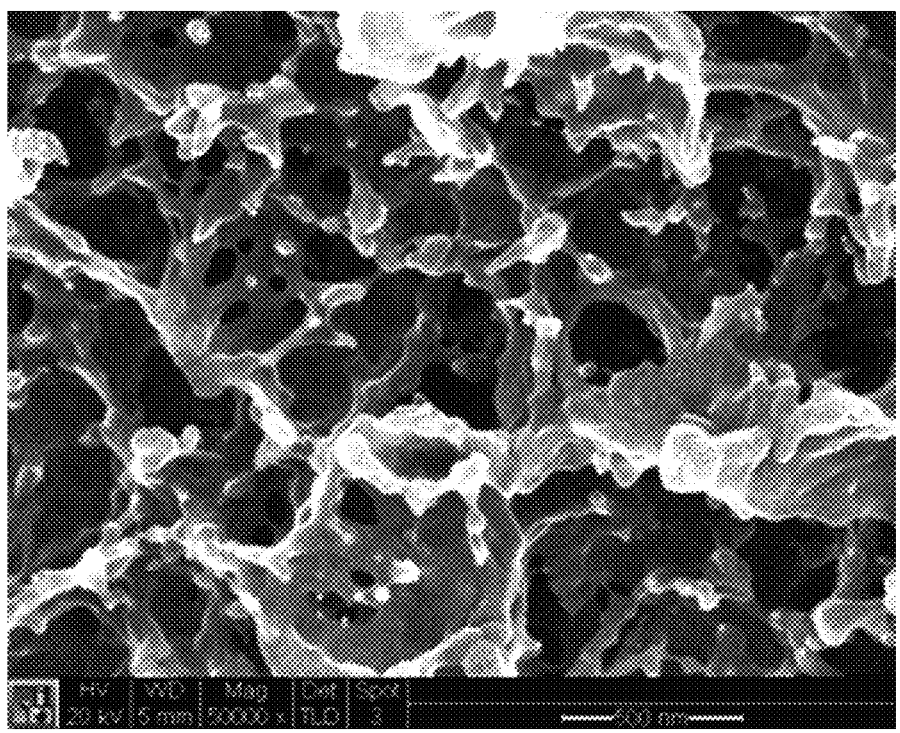
FIG. 12 is an SEM image of nanocellular features.

This measured average cell size depends heavily on the criteria for cell selection. FIG. 12 shows a typical foam at high magnification. For this disclosure, a feature is considered a cell if it was darker than its surroundings, had a distinct edge, and did not contain smaller features that also fit these criteria. Thus, only the smallest features are included in the measurement.

The solid-state process can be difficult to apply to thin films because of their susceptibility to desorption. Due to the short diffusion length scale, a thin film sample will desorb much faster than a thicker sample. Accordingly, in situ foaming may be used to foam polymers. In situ foaming is a process where the sorption step 200 and the foaming step 204 occur in the same vessel to minimize desorption at the surface and the formation of skin layers.

The apparatus for in situ foaming may include a steel pressure vessel with circular ceramic heating elements positioned on an adjustable frame inside the vessel. The polymer can be held between two thin metal screens positioned on an adjustable platform sandwiched between the heaters. However, other configurations are possible. The pressure vessel is supplied with carbon dioxide by a pressurized cylinder. The saturation process may proceed at room temperature.

In the sorption step 200, a PEI film of a thickness of 0.127 mm (0.005") may be used at a saturation time of 60 minutes and a saturation pressure of 5 MPa.

After the saturation step 200, the polymers were foamed in situ by internal heaters. The heating elements may include ceramic disks, for example. As the temperature in the pressure vessel rises, the pressure increases correspondingly, in accordance with thermodynamic principles. A pressure controller can be set to control the pressure increase without the overpressure venting. After a set foaming time, during which the heaters are powered, the heaters are disengaged and the vessel is allowed to cool down to room temperature before the pressure is released and the foam is removed.

Using the in situ foaming process, some polymers may not foam, some polymers may foam unevenly, or some polymers may not foam with open nanocellular structures.

While foaming of thin films is possible with in situ foaming, the solid skin layer may not be eliminated or significantly reduced in the process. Furthermore, the foamed samples may not have open nanocellular structures. The presence of the solid skin layer is likely due to desorption from the surfaces of the sample that occurs while the sample is heating but prior to reaching the threshold foaming temperature. Though the saturation pressure is still present, the increased temperature reduces the solubility of gas in the polymer, leading to desorption. The heating rate may be increased through the use of more powerful heaters, which may produce foams without skins.

During the sorption step 200, the carbon dioxide inside the pressure vessel is a supercritical fluid. Supercritical fluids may minimize the necessary saturation time, but are constrained by safety and reliability concerns. Higher pressures lead to higher saturation concentrations but longer saturation times. The temperature and pressure inside the pressure vessel is held above the critical point of the gas (31.1° C. and 7.38 MPa for carbon dioxide) to ensure that the gas is a supercritical fluid. Higher saturation temperatures lead to faster diffusion, but decrease the saturation concentration. A saturation temperature of 45° C. was chosen to provide fast saturation.

FIG. 3 shows a graph plotting the carbon dioxide concentration versus time at 45° C. and 20 MPa. Under these conditions, the polymer is considered to be saturated after 72 hours of sorption. This time, 72 hours, is considered a minimum amount sufficient for a PEI polymer to be considered saturated. The gas concentration of the sample is assumed to not change from this condition with longer saturation times FIG. 4 shows a graph plotting the carbon dioxide concentration during desorption versus time at room temperature (23° C.) and 0° C. at atmospheric pressure. As discussed further below, there is a higher rate of internal blistering at lower desorption times. Referring to FIG. 7A, internal blisters 700 can form around the mid-plane of the polymer sheet and expand perpendicularly to the clamping force. In extreme cases, the internal blisters can join and form large air pockets.

Referring to FIG. 2, block 206 is a step for removing the solid skin layer and reducing the thickness of the foam to the desired thickness suitable for battery separators. This step exposes the open nanocellular structure to the exterior, allowing the foam to permit the transfer of ions, for example, across the foam from one side to the other. In some embodiments, the thickness of the foam is reduced to a thickness of less than about 30 μm. However, the thickness is determined based on the particular battery characteristics.

The methods of skin removal may include machining and polishing. Machining can be conducted on a standard 3-axis turret mill. A sharp steel, 4-flute end mill can be used for machining the foam surface. Milling speeds can range from 1400-1800 rpms. The foams may be machined in successive passes of distinct cutting depths, ranging from 0.10-0.30 mm. The feed rate of each pass was controlled by hand and could not be measured.

Polishing may be accomplished on any suitable polisher, such as those used to polish metals to a minor-like surface. For smaller foams, a suitable polisher is known as a Buehler EcoMet 250 Grinder-Polisher. The machine holds a sample against a polishing wheel with a set force while spinning the foam and the wheel at set speeds. A water jet wets the surface of the polishing wheel during the process. A diamond polishing pad can be used to abrade the foam. In some embodiments, a force of 1 pound, a polishing wheel rotation of 80 rpm, and a foam rotation of 40 rpm is suitable. Once one side of the foam is reduced, the foam is turned on its opposite side to remove the opposite solid skin layer, and/or transition layer.

Referring to FIG. 2 again, after block 206, a step for assembling a battery cell follows in block 208. Block 208 is for fabrication of the battery cell using the nanocellular foam produced via the solid-state foaming process when the polymer is saturated with supercritical carbon dioxide fluid. The fabrication involves collecting the cell battery parts, including, for example, the cathode, the anode, positive and negative electrodes, electrolyte, and battery casing, and other components. The assembling of the battery cell will be known to one of skill in the art, except that instead of using conventional battery separators, the battery separator made from a nanoporous foam created via the solid-state process disclosed herein is used in the fabrication. For example, the fabrication of the battery will include placing the foam battery separator between the positive and negative plates of a battery cell.

The saturation temperature and pressure strongly affect the resulting foam structure. The use of pressures and temperatures in the supercritical range of carbon dioxide may reduce the saturation time. The conditions of 20 MPa and 45° C. result in similar equilibrium carbon dioxide concentration as 5 MPa and 23° C. but with reduced saturation time. Higher carbon dioxide concentrations may lead to smaller nano-scale features and lower relative densities.

The desorption time controls the final carbon dioxide concentration distribution across the sample at the time of foaming. The concentration distribution strongly influences the core cell structure, skin layer thickness, and transition layer thickness. The desorption time may reduce the formation of internal blisters. When the gas-saturated polymer is allowed to desorb for at least 35 minutes, the rate of internal blistering is very low. This amount of desorption leaves a nanocellular core in place.

The foaming time controls the nucleation and growth of the cells within the sample. Longer times in the press lead to larger average cell sizes. However, the longer exposure to the external compressive force of the press causes the samples to become denser. Thus, in seeking to produce a sample with minimal average cell size and density, the foaming time should be small. However, shorter foaming times were found to strongly affect the flatness of the foamed sample. This is likely due to the relaxation of internal stresses caused by cell nucleation and growth. The foaming time should be selected to produce flat samples with the desired cellular structure.

The clamping force holds the sample in place during foaming and constrains its growth to a plane. However, higher clamping forces result in thinner, denser samples. For the production of samples using this process, a low clamping force should be used. Higher clamping forces combined with high temperatures and foaming times may be utilized to produce foamed thin films from thicker sheets. This may be a solution to the inherent issues of using the microcellular process on thin films, where rapid desorption limits the process.

The foaming temperature and gas concentration largely determine the structure of the foam. In press foaming, the temperature is bound by the glass transition temperature of the raw PEI (217° C.). As the foaming temperature approaches this transition, the samples lose thickness and become denser, even failing to foam in some locations. It was found that the relative density of the samples was lowest at 195° C. Several nanoscale morphologies can be achieved with small changes in the foaming temperature.

The solid skin and transition layers may be removed through physical abrasion. Machining the sample surface using standard milling techniques may produce jagged, warped surfaces with poor acetone absorption characteristics. Polishing the sample surface produces flat, even surfaces that readily absorb acetone and dye. Polishing the skin and transition layers confirmed that the nanocellular core structure is open and porous.

In situ foaming used a slow rate of heating of the sample surface resulting in desorption at the surface and formation of a solid skin layer. In order to provide foams without a solid skin layer using an in situ foaming method, the pressure vessel may be flooded with a preheated liquid or gas. This would instantaneously heat the sample surface. This process may take place without reducing the pressure on the sample.

The solid-state foams may be processed into battery separators. The polishing method of solid skin removal may produce thin, open, porous battery separators. However, other methods of removal may also produce satisfactory results.

In some embodiments, a method for making a flat, blister-free foam with an open, interconnected cellular structure, includes: saturating a solid-state polymer with a non-reacting gas in a vessel at conditions wherein the gas is supercritical and producing a gas-saturated solid-state polymer; placing the gas-saturated, solid-state polymer at atmospheric pressure and temperature to partly desorb gas; placing the partly desorbed, gas-saturated, solid-state polymer in a press; in the press, heating the partly desorbed, gas-saturated solid-state polymer at a temperature effective to allow polymer chains to move in relation to one another and allow gas to nucleate into cells and grow, without melting the polymer, while the press applies a clamping force that constrains the polymer in a thickness dimension and produces a foam; and removing a solid skin layer on exterior surfaces of the foam and creating an open interconnected cellular structure throughout a thickness of foam.

In some embodiments, the gas-saturated polymer is desorbed in atmospheric pressure for about 35 minutes.

In some embodiments, the partly desorbed, gas-saturated solid-state polymer is heated in the press for about 3 minutes or greater.

In some embodiments, the polymer is a thermoplastic polymer.

In some embodiments, the polymer is polyetherimide.

In some embodiments, a pressure inside the vessel is at or greater than a critical pressure of carbon dioxide of 7.39 MPa.

In some embodiments, a temperature inside the vessel is at or greater than a critical temperature of carbon dioxide of 31.1° C.

In some embodiments, the clamping force is 1 ton (imperial) or less.

In some embodiments, the effective temperature is 165° C. to 175° C., 175° C. to 185° C., 185° C. to 195° C., or 195° C. to 205° C.

In some embodiments, the solid-state polymer is about 100% by weight polyetherimide.

In some embodiments, the polyetherimide has the formula

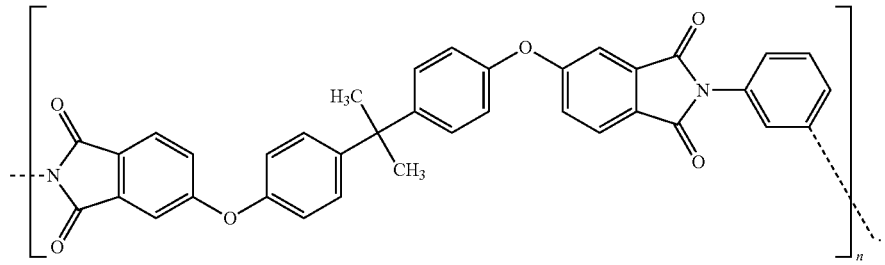

In some embodiments, the foam includes an open interconnected nanocellular structure throughout a thickness of the foam, wherein the cellular structure comprises cells having a characteristic diameter of 100 nm or less, and the foam thickness is about 30 μm or less.

In some embodiments, the characteristic diameter is 50 to 100 nm.

In some embodiments, the method includes polishing the foam to remove a skin layer.

In some embodiments, the method includes polishing the foam to remove a skin layer and a transition layer comprising a microcellular structure.

In some embodiments, a battery cell includes a foam made by the process of any one of the above embodiments and placing the foam between a cathode and anode to assemble a battery cell.

In some embodiments, a polymer foam includes a unitary flat foam material having an open interconnected nanocellular structure throughout a thickness of the foam, wherein the cellular structure comprises cells having a characteristic diameter of 100 nm or less, and the foam thickness is about 30 μm or less.

In some embodiments, the characteristic diameter is 50 to 100 nm.

In some embodiments, the polymer foam is about 100% by weight polyetherimide.

In some embodiments, a battery separator includes the polymer foam of anyone of the above embodiments.

In some embodiments, the concentration of carbon dioxide in the solid-state polymer before desaturation is in the range of about 8 to about 11.5% by weight, In some embodiments, the time for gas sorption of carbon dioxide in the solid-state polymer at 45° C. and 20 MPa is from 20 to 120 hours.

In some embodiments, the time for gas sorption of carbon dioxide in the solid-state polymer at 45° C. and 20 MPa is about 72 hours.

In some embodiments, the time for desorption at atmospheric pressure is from 5 to 75 minutes. In some embodiments, the time for desorption at atmospheric pressure is greater than 35 minutes. In some embodiments, the time for desorption at atmospheric pressure of 14.7 psia is from 35 to 75 minutes.

In some embodiments, the foaming time (heating time) is chosen from 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, or any range derived therefrom. In some embodiments, the foaming time is chosen from 3.0, 3.5, 4.0, 4.5, 5.0, 5.5, 6.0, 6.5, 7.0, 7.5, 8.0, 8.5, 9.0, 9.5, 10.0, or any range derived therefrom. In some embodiments, the foaming time is greater than 3.0 minutes.

In some embodiments, the clamping force of the press is chosen from 0.1, 0.5, 1.0, 5.0, 10 tons, or any range derived therefrom. In some embodiments, the clamping force is 1 ton or less. In some embodiments, the clamping force is 0.1, 0.5, 1.0, or any range derivable therefrom.

In some embodiments, the effective temperature (the temperature at the platens of the clamp) is chosen from 165° C., 170° C., 175° C., 180° C., 185° C., 190° C., 195° C., 200° C., 205° C., 210° C., or any range derivable therefrom. In some embodiments, the foaming temperature is 175° C. or less. In some embodiments, the foaming temperature is 165° C. or less. In some embodiments, the foaming temperature is 210° C. or less. In some embodiments, the foaming temperature is from 195° C. to 205° C. In some embodiments, the foaming temperature is from 165° C. to 175° C. In some embodiments, the foaming temperature is from 185° C. to 195° C.

In some embodiments, the foam is polished. The polishing may remove about 0.15 mm per minute of material from the surface of the foam.

In some embodiments, a method to produce a foam may use the following conditions: the foaming temperature (at the press platens) is 195° C., the foaming time is 3 minutes, the clamping force is 0.5 imperial tons, and the desorption time is from 5-75 minutes at atmospheric pressure. Under these conditions, a desorption time of about 35 minutes or greater resulted in no blistering.

In some embodiments, a method to produce a foam may use the following conditions: the foaming temperature (at the press platens) is 195° C., the clamping force is 0.5 imperial tons, the desorption time is greater than 60 minutes at atmospheric pressure, and the foaming time is varied from 0.5 to 10 minutes. Under these conditions, a foaming time of about 2 minutes and 45 seconds, or just under 3 minutes and greater resulted in foams that are not curved. However, maintaining the foaming time to about 3 minutes and varying the clamping force from 0.1 to 10 tons can influence the cell size and density. At 0.1 tons, the average cell size is 43 nm, and the relative density is 36%, while at 10 tons, the average cell size is 4.2 μm and the relative density is 56%.

In some embodiments, a method to produce a foam may use the following conditions: the clamping force is 0.5 imperial tons, the desorption time is greater than 60 minutes at atmospheric pressure, the foaming time is 3 minutes, and the foaming temperature (temperature at the platens) is varied from 165 to 210° C. The relative density decreases with increasing temperature in the range from 165 to 185° C., while the relative density increases in the range of 205 to 210° C.

EXAMPLES

Unless otherwise stated, PEI samples in the following examples were exposed to supercritical carbon dioxide fluid at 20 MPa and 45° C. for at least 72 hours during the sorption step.

Example 1

Variation of Desorption Time

One PEI sample was foamed at each of eight desorption times at room temperature. The chosen desorption times were every ten minutes from 5 to 75 minutes. The samples were foamed for 3 minutes at a platen temperature of 195° C. and a clamping force of 0.5 tons. The resulting foam samples were characterized by the presence of internal blisters, relative density, skin layer thickness, and transition layer thickness.

Figure 19:
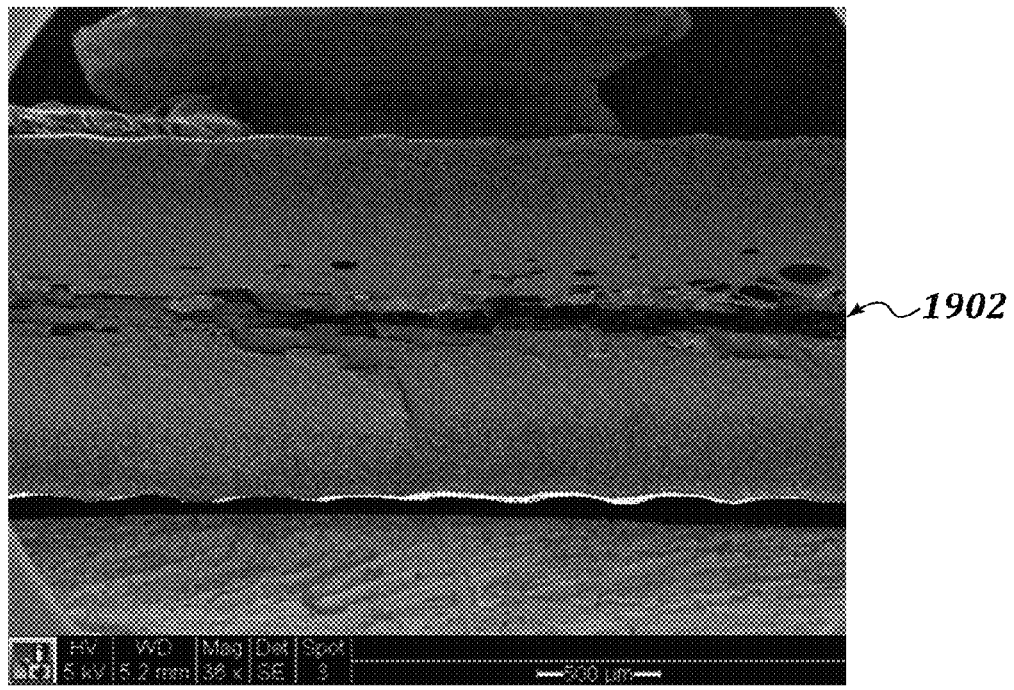
FIG. 19 is an SEM image of a foam sample with an internal blister.
Figure 20:
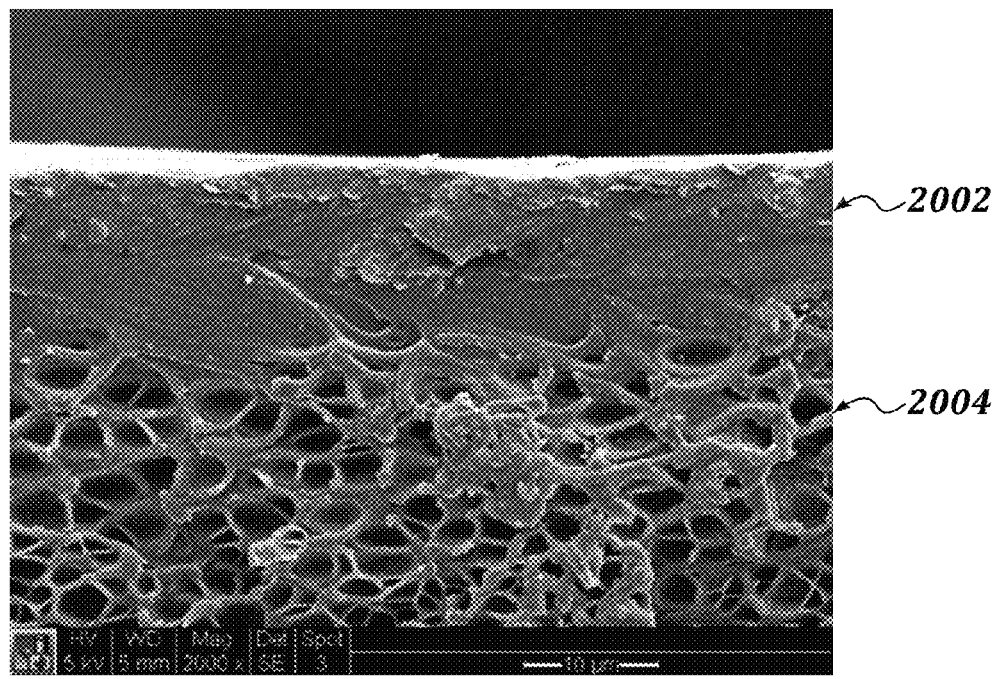
FIG. 20 is an SEM image of a foam sample showing a skin layer and transition layer.

FIG. 6 is a graph showing the results of varying desorption time prior to foaming the samples in the press. The solid skin remains between 10-20 μm thick, while the transition layer grows steadily from 54 to 326 μm. This effect is due to the diffusion of carbon dioxide out of the sample during desorption. The gas escapes at the surface of the sample, where the lowest concentrations are found. The concentration increases steadily from here to the core region, which remains at its saturation concentration. The locally lower gas concentration near the surface leads to the development of fewer and larger cells characteristic of the transition layer. Thus, more desorption leads to a thicker transition layer. Samples foamed after less than 35 minutes of desorption contained considerable internal blistering. Samples foamed after 35 or more minutes contained no internal blisters but had thicker transition layers. FIG. 19 shows a foam created from a polymer that was desorbed for 25 minutes prior to foaming for 3 minutes at 195° C. and a clamping force of 0.5 tons. The foam shows an internal blister 1902 forms around the mid-plane of the polymer. FIG. 7A shows internal blistering in sample 4.23.1.2. FIG. 20 shows an SEM image of a foam sample showing skin layer 2002 and a transition layer 2004. FIG. 7B shows foam sample 4.23.1.7 that was desorbed for 65 minutes.

TABLE 12.1

Desorption Results

| Sample | Desorption Time, m | Blistered? | Curved? | Mean Thickness, mm | Relative Density | Skin Thickness, μm | Transition Layer Thickness, μm |
|---|---|---|---|---|---|---|---|
| 4.26.1.1 | 5 | Y | N | 1.34 | 55.4 | 10 | 54 |
| 4.26.1.2 | 15 | Y | N | 1.48 | 46.0 | 14 | 106 |
| 4.26.1.3 | 25 | Y | N | 1.51 | 45.3 | 15 | 243 |
| 4.26.1.4 | 35 | N | N | 1.56 | 44.1 | 17 | 208 |
| 4.26.1.5 | 45 | N | N | 1.55 | 46.9 | 15 | 210 |
| 4.26.1.6 | 55 | N | N | 1.59 | 44.0 | 20 | 284 |
| 4.26.1.7 | 65 | N | N | 1.56 | 44.0 | 18 | 309 |
| 4.26.1.8 | 75 | N | N | 1.60 | 40.5 | 17 | 326 |

Internal blistering during press foaming can be avoided with longer desorption times. The desorption time for avoiding internal blistering may be short enough that the resulting sample may still possess a nanocellular core region. Under these conditions, samples foamed after at least 35 minutes of desorption did not contain internal blisters. The mechanism of this effect is not fully understood. However, the formation of large, connected blisters is likely due to adherence between the platens and the surface of the samples. Despite using the PTFE-coated fabric to prevent the sample from adhering to the platen, some degree of attachment remains, often causing the sample to stick to the upper platen when the press opens. The tension forces caused by this attachment likely are responsible for pulling apart the blister-weakened halves of the foamed samples.

Measurements showed that the skin thickness did not increase steadily with desorption time. The skin thickness remained between 10 and 20 μm. By contrast, the transition layer thickness increased with desorption time from 54 to 326 μm. The transition layer thickness is considered a parameter in further processing of these samples for skin and transition layer removal. A thicker transition layer means more material must be removed to expose the nanoporous core.

Example 2

Variation of Foaming Time

Foaming time is the time during which the sample is compressed under heating conditions. Samples that were held in the press for very short amounts of time (less than 30 seconds) would foam but would have significant curvature after release from the press. Longer foaming times may reduce curvature by relaxing residual stresses caused by foaming.

The foaming times included 0.5, 1, 1.5, 2, 2.5, 3, 3.5, 4, 4.5, 5, 7.5, and 10 minutes. One sample was foamed for each selected foaming time. The clamp force was set to 0.5 tons and the platens were heated to 195° C. Due to the long foaming times necessary, the samples were allowed to desorb for 60 minutes before being placed in a freezer set to 0° C. to retard further desorption. The samples were then removed two at a time and promptly foamed. The goal was to minimize the difference in desorption between all of the samples.

Figure 14:
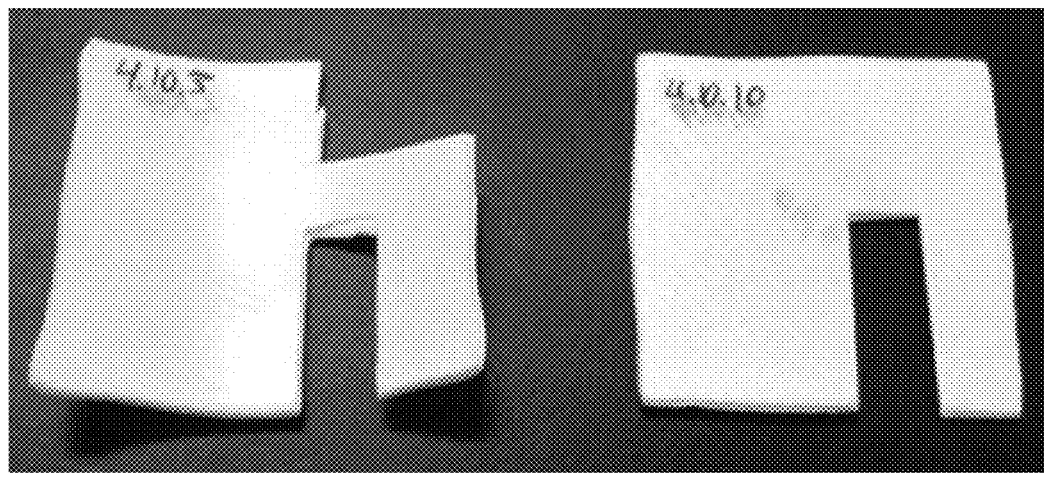
FIG. 14 is an image of two samples foamed at 1.5 minutes (left) and 5 minutes (right)
Figure 21:
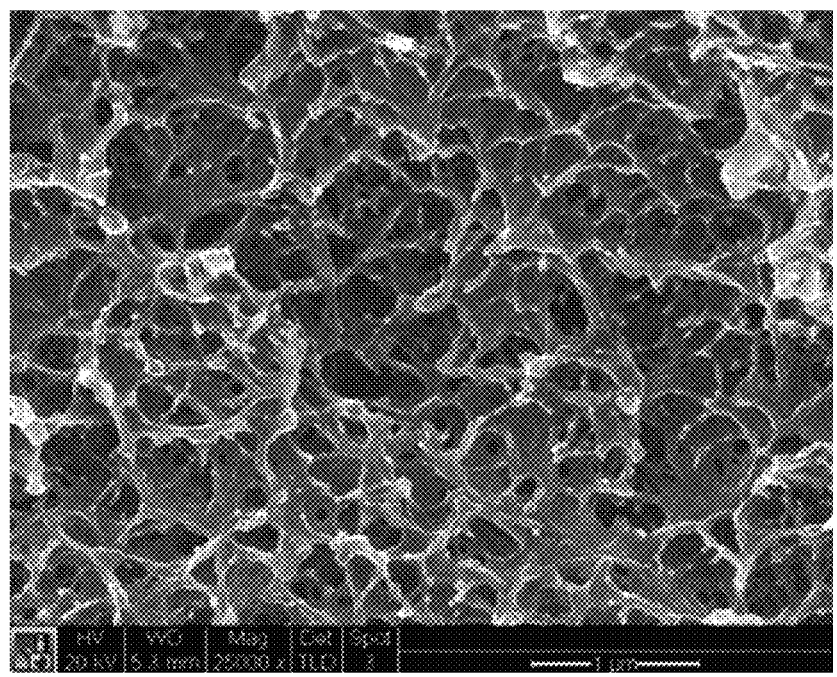
FIG. 21 is an SEM image of a foam sample foamed for 30 seconds.
Figure 22:
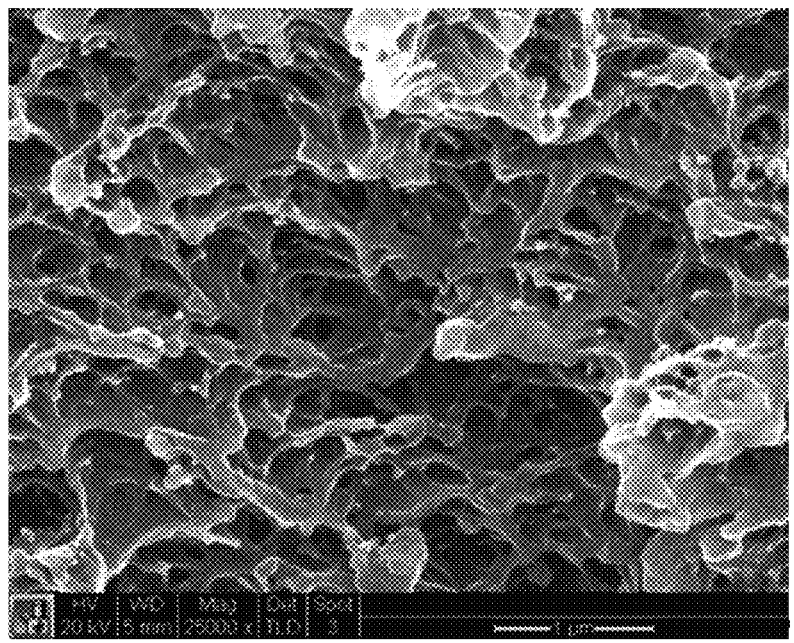
FIG. 22 is an SEM image of a foam sample foamed for 4.5 minutes.

The samples foamed under these conditions for 3 minutes or longer were not curved. Table 12.2 contains the results for each sample. FIG. 14 shows the difference in curvature between two of the samples. FIG. 21 is an SEM image of sample 4.10.1, which was foamed for 30 seconds. FIG. 22 is an SEM image of sample 4.10.9, which was foamed for 4.5 minutes.

TABLE 12.2

Foaming time experiment results.

| | | | | | SEM Analysis | |
| --- | --- | --- | --- | --- | --- | --- |
| Sample | Foam Time, min | Curved? | Mean Thickness, mm | Relative Density | Average Cell Size, nm | Cell Size Standard Deviation, nm |
| 4.10.1 | 0.5 | Y | 1.79 | 36.4% | 51 | 26 |
| 4:10.2 | 1 | Y | 1.73 | 40.0% | 51 | 26 |
| 4.10.3 | 1.5 | Y | 1.62 | 41.2% | 62 | 29 |
| 4.10.4 | 2 | Y | 1.56 | 42.5% | 67 | 37 |
| 4.10.5 | 2.5 | Y | 1.62 | 43.6% | 72 | 42 |
| 4.10.6 | 3 | N | 1.46 | 48.2% | 62 | 32 |
| 4.10.7 | 3.5 | N | 1.37 | 52.8% | 67 | 57 |

TABLE 12.2-continued

Foaming time experiment results.

| | | | | | SEM Analysis | |
| --- | --- | --- | --- | --- | --- | --- |
| Sample | Foam Time, min | Curved? | Mean Thickness, mm | Relative Density | Average Cell Size, nm | Cell Size Standard Deviation, nm |
| 4.10.8 | 4 | N | 1.44 | 52.1% | 90 | 54 |
| 4.10.9 | 4.5 | N | 1.40 | 54.0% | 99 | 65 |
| 4.10.10 | 5 | N | 1.47 | 51.2% | 94 | 62 |
| 4.10.11 | 7.5 | N | 1.46 | 53.4% | 97 | 51 |
| 4.10.12 | 10 | N | 1.39 | 54.2% | 68 | 55 |

Increased foaming time can result in flat samples. However, increasing the foaming time also has a significant effect on the nanostructure of the foam. FIG. 10 shows the average cell size as a function of foaming time. There is a clear trend of cell growth with increased foaming time for samples foamed for less than 5 minutes. FIG. 8 shows a similar trend of growing relative density in samples foamed for less than 5 minutes.

Curvature in foamed samples is expected from oil bath foaming. This is likely due to residual stresses in the material and uneven heating and cooling during foaming. A reason for using a hot press foaming method instead of an oil bath is to eliminate this curvature. However, samples foamed for short amounts of time in the hot press showed some remaining curvature. Under certain conditions, it was found that a sample may be foamed for at least 3 minutes to emerge from the press without residual curvature.

Similar to what is observed in microcellular foaming, the cell size increases with longer foaming times. This means that in using a longer foaming time to ensure flat samples, some sacrifice is made in the final cell size. The smallest average cell size in a flat sample obtained is on the order of 62.9 nm with a relative density of 48.2%.

The relative density also increases with longer foaming times. This is contrary to what is seen in microcellular foaming in an oil bath, where longer foaming produces larger cells and less dense samples. The press foamed samples cannot grow in the same unconstrained environment as an oil bath. The force of the platens resists this growth and even reduces the thickness of the samples over time. This explains the densification seen in the longer foaming time samples.

Example 3

Variation of Clamping Force

Clamping force is the force that holds the sample in place between the press platens while foaming and ensures even heating and constrains the sample growth in the thickness dimension to maintain the desired flatness. However, this force may also contribute to the perpendicular growth of internal blisters and higher relative densities in the final foam due to physical compression of the plasticized sample.

While other press foaming experiments used a clamping force of 0.5 tons, for this experiment, the clamping forces included 0.1, 0.5, 1, 5, and 10 tons. One sample was foamed at each of the selected clamping forces. The samples were desorbed for between 88 and 107 minutes before foaming. All samples were foamed at 195° C. for 3 minutes.

Figure 15:
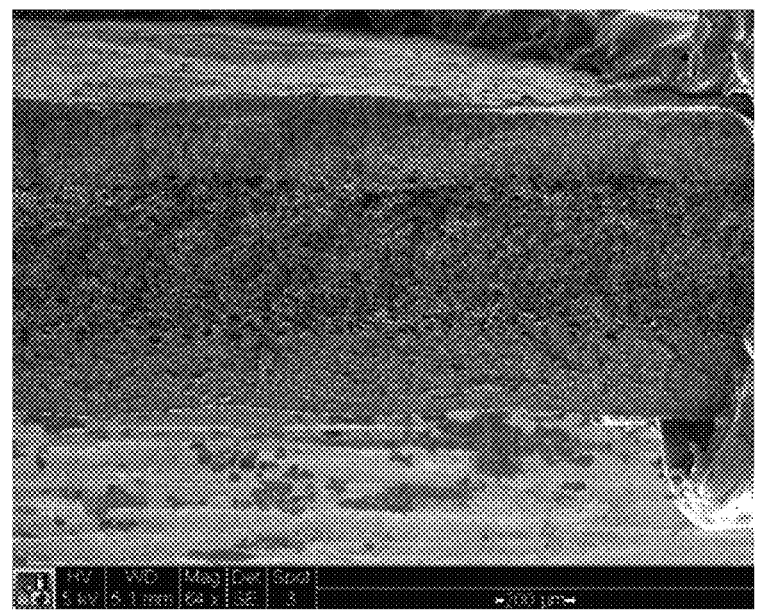
FIG. 15 is an SEM image of a sample foamed at a clamping force of 10 tons.
Figure 23:
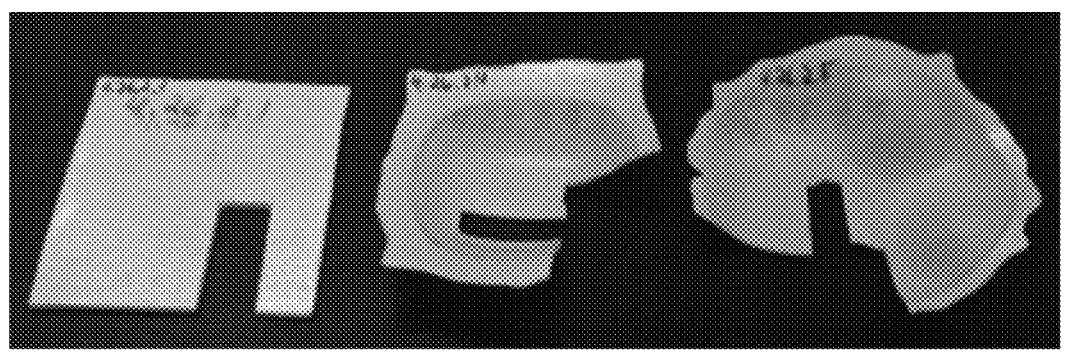
FIG. 23 is an image of foam samples foamed at clamping forces of 0.1 tons, 5 tons, and 10 tons from left to right.
Figure 24:
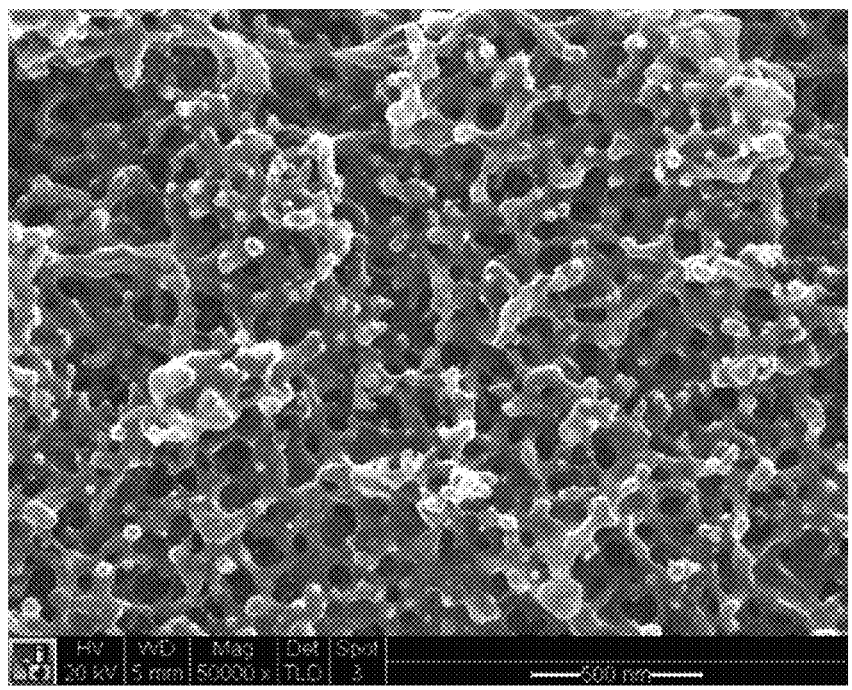
FIG. 24 is an SEM image of the nanostructure of a foam sample foamed at a clamping force of 0.1 tons.
Figure 25:
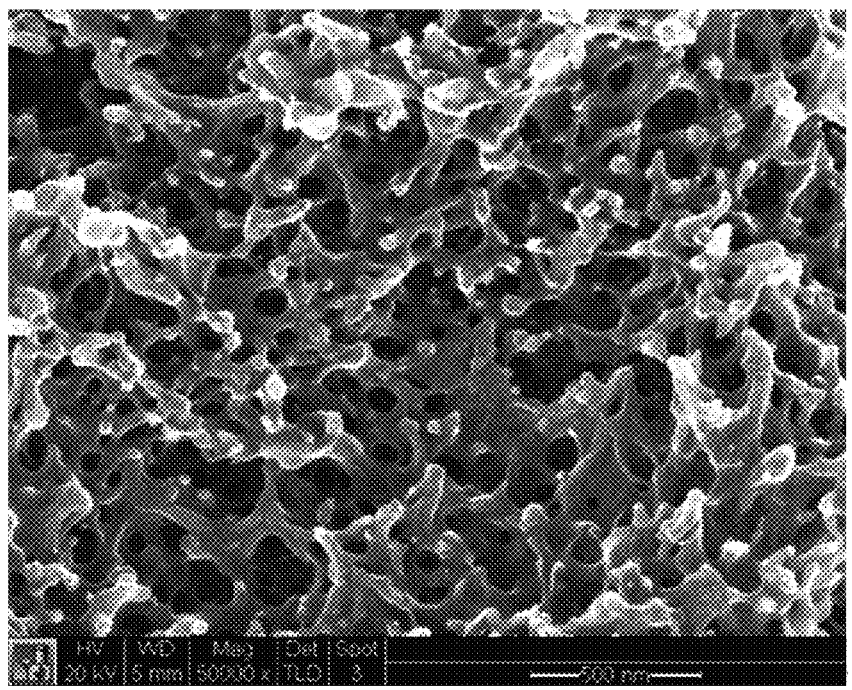
FIG. 25 is an SEM image of the nanostructure of a foam sample foamed at a clamping force of 0.5 tons.
Figure 26:
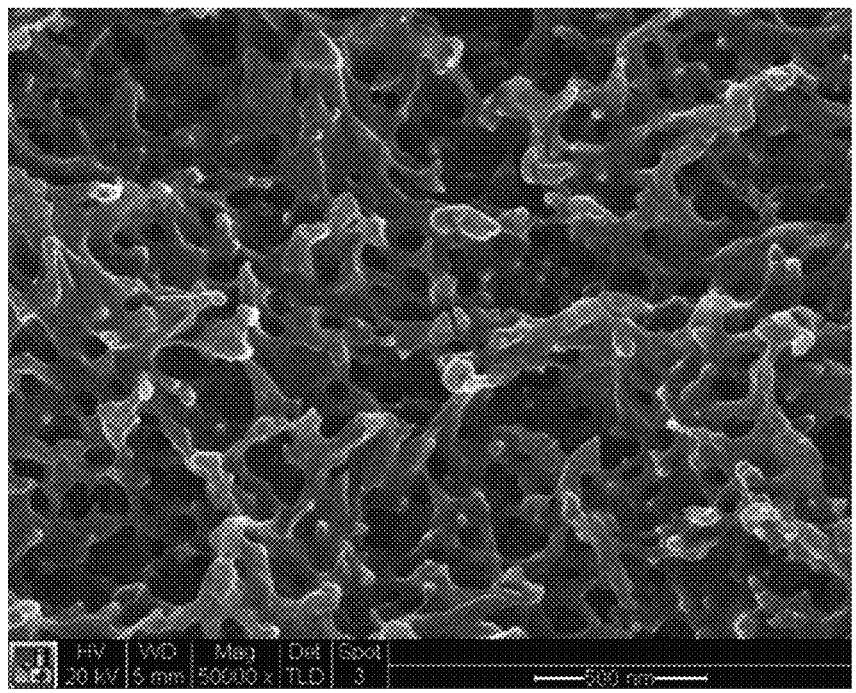
FIG. 26 is an SEM image of the nanostructure of a foam sample foamed at a clamping force of 1 ton.
Figure 27:
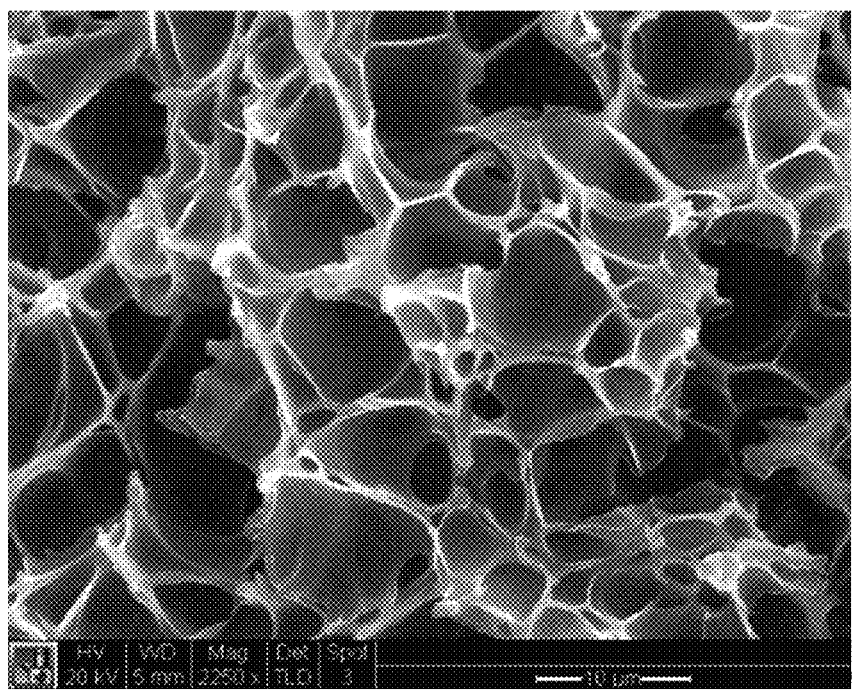
FIG. 27 is an SEM image of the microstructure of a foam sample foamed at a clamping force of 5 tons.
Figure 28:
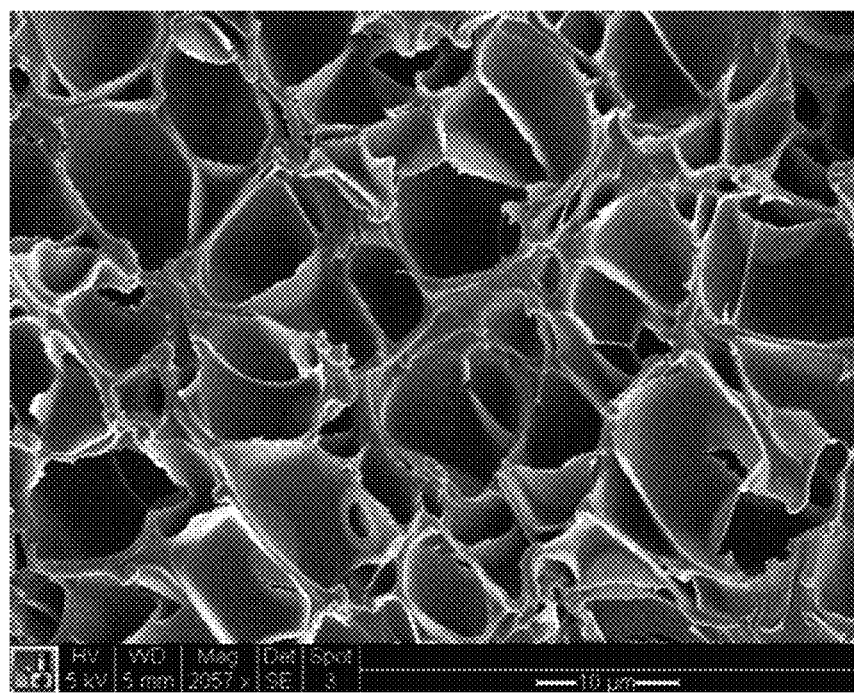
FIG. 28 is an SEM image of the microstructure core of a foam sample foamed at a clamping force of 10 tons.
Figure 29:
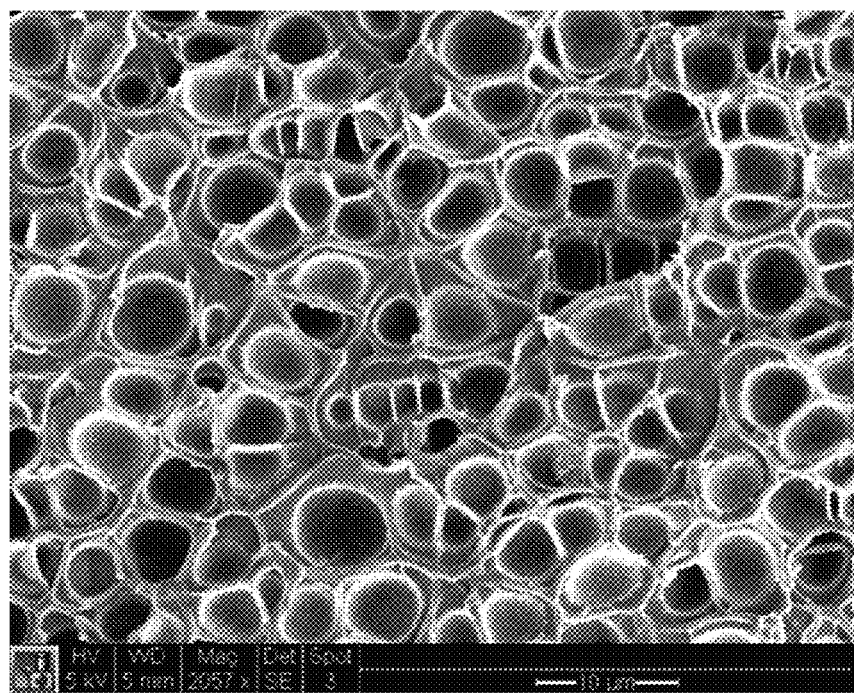
FIG. 29 is an SEM image of the transition layer of a foam sample foamed at a clamping force of 10 tons.

The samples foamed at 0.1, 0.5, and 1 ton foamed evenly and maintained their general shape. The samples foamed at 5 and 10 tons deformed significantly during foaming and had different foam structure at the edges than in the middle. A sample foamed at 0.1 ton had some small blisters at one edge after foaming. Table 12.3 contains the foaming conditions and results of this experiment. Reported values for the 5 and 10 ton samples were measured in the darker central region of the sample. FIG. 23 is an image of foam samples foamed at clamping forces of 0.1 tons, 5 tons, and 10 tons from left to right. FIG. 24 is an SEM image of the nanostructure of foam sample 4.26.1 foamed at a clamping force of 0.1 tons. FIG. 25 is an SEM image of the nanostructure of foam sample 4.26.2.2 foamed at a clamping force of 0.5 tons. FIG. 26 is an SEM image of the nanostructure of foam sample 4.26.2.3 foamed at a clamping force of 1 ton. FIG. 27 is an SEM image of the microstructure of foam sample 4.26.4 foamed at a clamping force of 5 tons. FIG. 28 is an SEM image of the microstructure core of foam sample 4.26.5 foamed at a clamping force of 10 tons. FIG. 29 is an SEM image of the transition layer of foam sample 4.26.2.5 foamed at a clamping force of 10 tons. FIG. 15 is an SEM image of the sample 2.26.2.5 foamed at a clamping force of 10 tons.

TABLE 12.3

Clamping force experiment results.

| Sample | Temp C. | Clamp Force, tons | Foam Time, m | Desorption Time, m | Mean Thickness, mm | Relative Density | Average Cell Size, nm |
|---|---|---|---|---|---|---|---|
| 4.26.2.1 | 195 | 0.1 | 3 | 88 | 1.70 | 35.5 | 42 |
| 4.26.2.2 | 195 | 0.5 | 3 | 93 | 1.53 | 46.3 | 43 |
| 4.26.2.3 | 195 | 1 | 3 | 98 | 1.37 | 53.9 | 45 |
| 4.26.2.4 | 195 | 5 | 3 | 103 | 1.28 | 45.0 | 4557 |
| 4.26.2.5 | 195 | 10 | 3 | 107 | 0.88 | 56.1 | 4220 |

The clamping force clearly has an effect on the resulting foam structure. Between 1 and 5 tons, there is a drastic change in the foam structure with cells growing by two orders of magnitude. The nanocellular sample cell size remained fairly constant, while the relative density grew from 35.5% at 0.1 ton to 53.0% at 1.0 ton and the samples became thinner. The microcellular samples had a transition layer of smaller, denser cells and a core of larger, less dense cells, as seen in FIG. 15.

The transition to microcellular structures at higher clamping forces reflects the high pressure induced in the foam reducing the number of nucleated cells during foaming. The cells that do nucleate then have more dissolved $CO_2$ to absorb per cell, causing a greater degree of expansion than in the nanocellular samples. This causes the extreme expansion and curvature seen in the final samples.

There is a trend of increasing relative density with increasing clamping pressure until the transition to microcellular foams. This is due to the compressive effect of the press and corresponds to the thickness loss. For the purposes of achieving the lowest relative density and cell size in a flat sample, the clamping force should be minimized.

Example

Variation of Platen Temperature

This example varies the temperature of the hot press platens. The foaming temperature strongly affects the nucleation of cells in a polymer. The foaming temperature must be above the effective glass transition temperature of the gas-saturated sample in order for foaming to take place.

Three samples were foamed at each of the 6 selected temperatures for a total of 18 samples. The selected temperatures were 165° C., 175° C., 185° C., 195° C., 205° C., and 210° C. The temperatures were intentionally kept below the original glass transition temperature of the raw PEI. A clamp force of 0.5 tons and a foaming time of 3 minutes were used in this experiment. All samples were desorbed for between 60 and 90 minutes prior to foaming.

Figure 16:
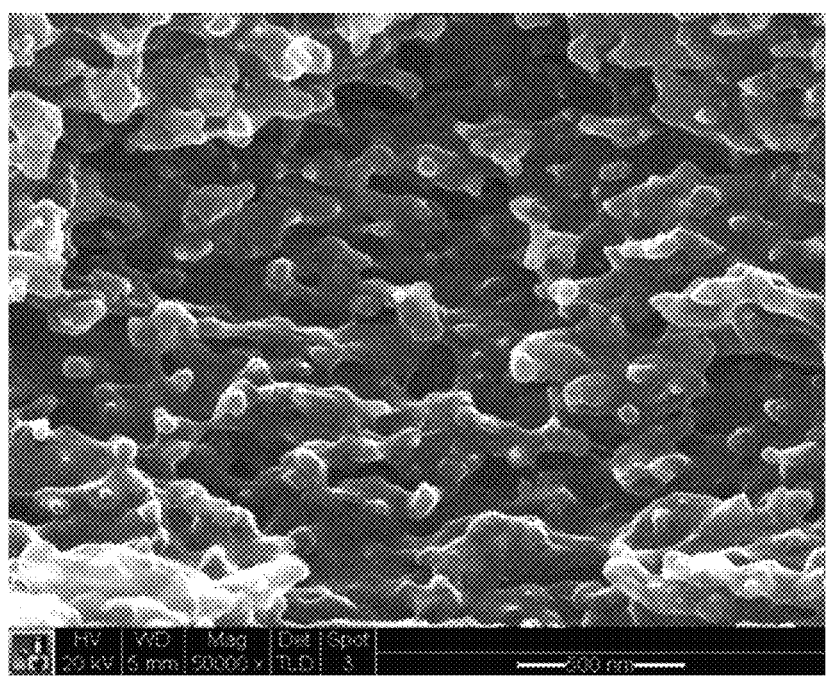
FIG. 16 is an SEM image of a sample foamed at 210° C.
Figure 30:
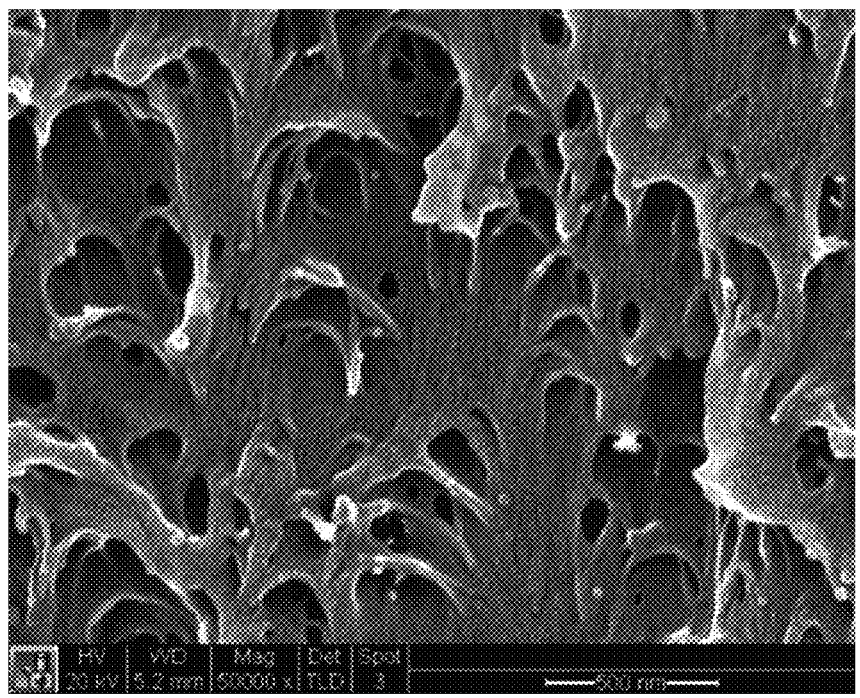
FIG. 30 is an SEM image of the nanostructure of a foam sample foamed at a platen temperature of 165° C.
Figure 31:
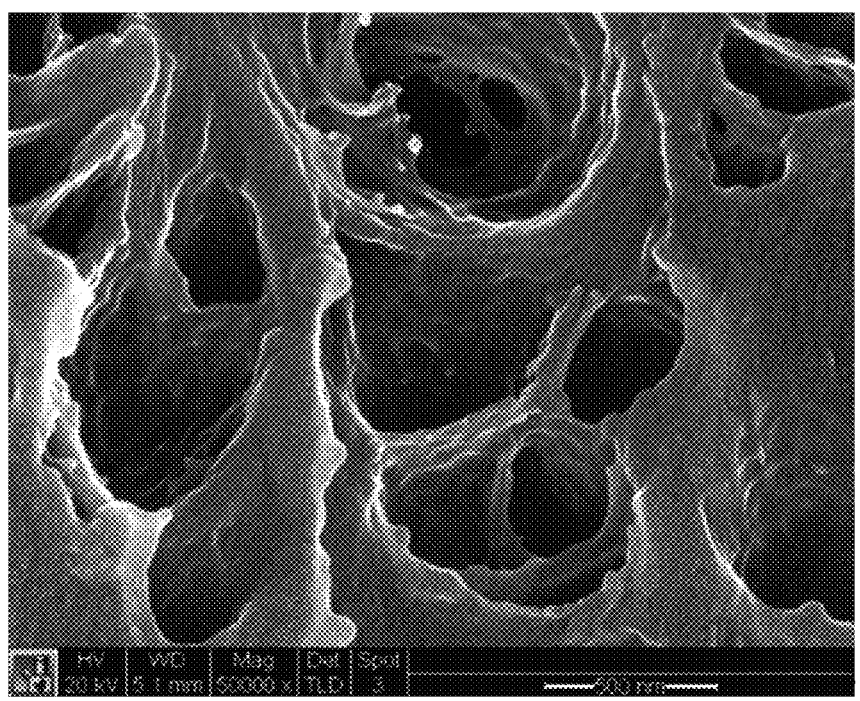
FIG. 31 is an SEM image of the nanostructure of a foam sample foamed at a platen temperature of 175° C.
Figure 32:
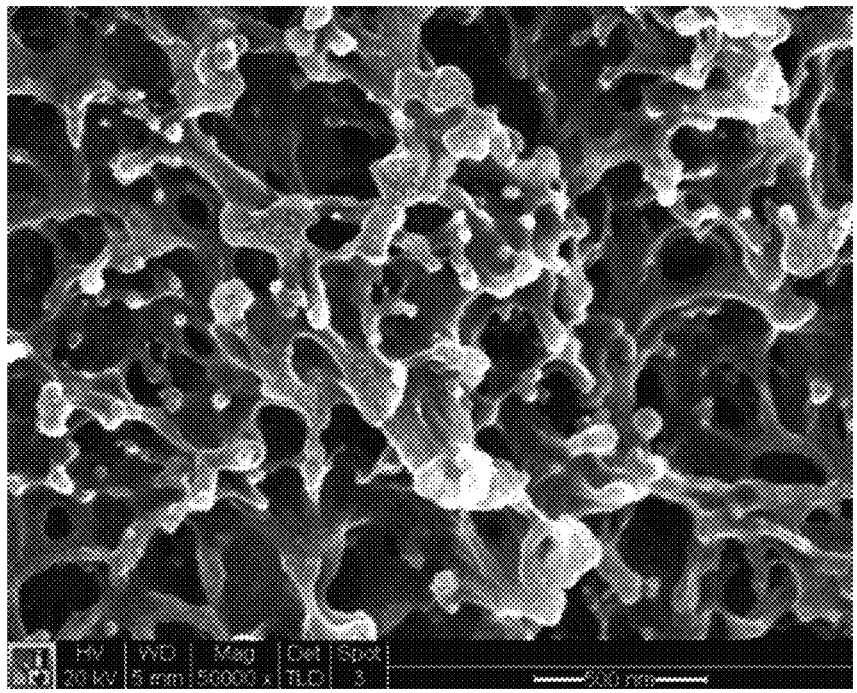
FIG. 32 is an SEM image of the nanostructure of a foam sample foamed at a platen temperature of 185° C.
Figure 33:
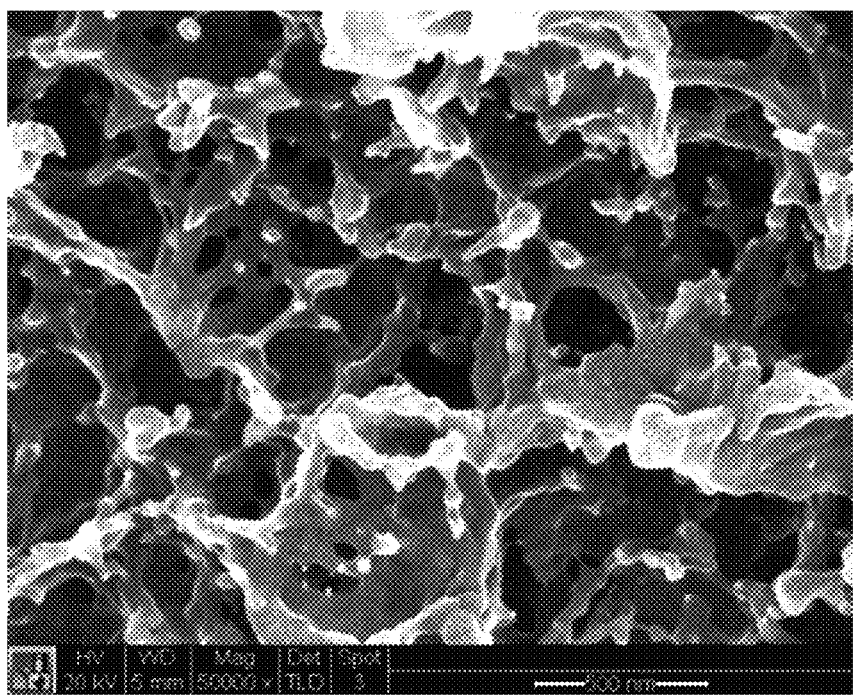
FIG. 33 is an SEM image of the nanostructure of a foam sample foamed at a platen temperature of 195° C.
Figure 34:
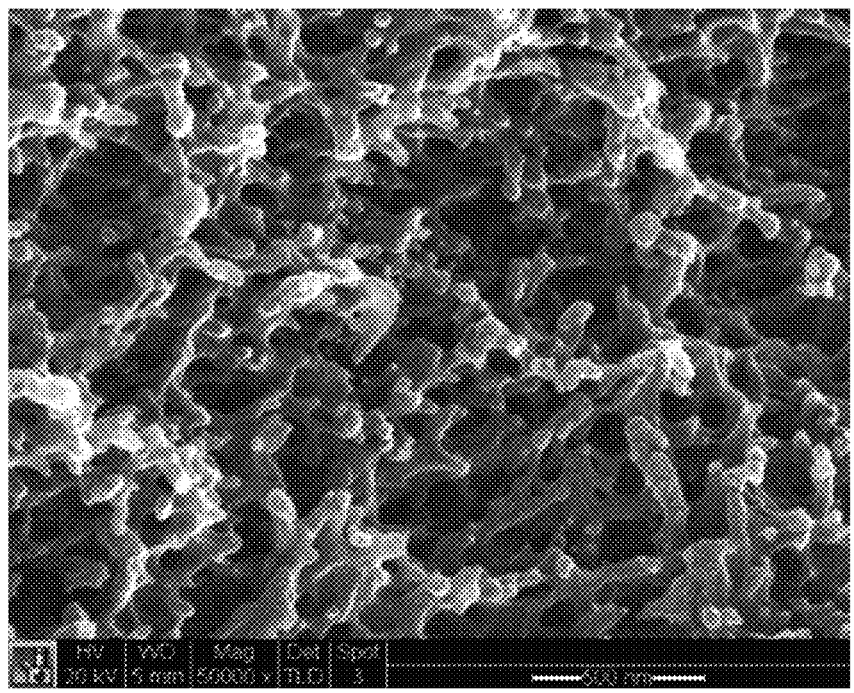
FIG. 34 is an SEM image of the nanostructure of a foam sample foamed at a platen temperature of 205° C.

Table 12.4 contains the results of the foaming temperature experiment. FIG. 8 shows the range of relative densities achieved with various foaming temperatures. The relative density decreases with increasing foaming temperature until reaching a lower limit at 195° C. The lowest relative density was 42.3%. The relative density rises dramatically between 205° C. and 210° C. FIG. 30 is an SEM image of the nanostructure of sample 3.12.1.1 foamed at a platen temperature of 165° C. FIG. 31 is an SEM image of the nanostructure of sample 3.12.1.5 foamed at a platen temperature of 175° C. FIG. 32 is an SEM image of the nanostructure of sample 3.12.2.2 foamed at a platen temperature of 185° C. FIG. 33 is an SEM image of the nanostructure of sample 3.12.2.4 foamed at a platen temperature of 195° C. FIG. 34 is an SEM image of the nanostructure of sample 3.12.3.3 foamed at a platen temperature of 205° C. FIG. 16 is an SEM image of the nanostructure of sample 3.12.3.5 foamed at a platen temperature of 210° C.

The samples foamed at 210° C. were significantly reduced in thickness from their pre-foamed state and had significant curvature. They also contain translucent regions that appear to not contain cells. The reported relative density was measured in the opaque parts of the sample.

TABLE 12.4

Foaming temperature experiment results.

| Sample | Temp C. | Desorption Time, m | Blistered? | Curved? | Mean Thickness, mm | Relative Density | Average Cell Size, nm |
|---|---|---|---|---|---|---|---|
| 3.12.1.1 | 165 | 66 | N | N | 1.37 | 65.5% | 50 |
| 3.12.1.2 | 165 | 69.5 | N | N | 1.40 | 66.5% | 46 |
| 3.12.1.3 | 165 | 73 | N | N | 1.30 | 68.0% | 37 |
| 3.12.1.4 | 175 | 82.5 | N | Y | 1.48 | 57.0% | 88 |

TABLE 12.4-continued

Foaming temperature experiment results.

| Sample | Temp C. | Desorption Time, m | Blistered? | Curved? | Mean Thickness, mm | Relative Density | Average Cell Size, nm |
|---|---|---|---|---|---|---|---|
| 3.12.1.5 | 175 | 86 | N | Y | 1.47 | 58.8% | 137 |
| 3.12.1.6 | 175 | 89.5 | N | Y | 1.46 | 59.9% | 92 |
| 3.12.2.1 | 185 | 60 | N | V | 1.59 | 46.9% | 50 |
| 3.12.2.2 | 185 | 63 | N | Y | 1.59 | 45.9% | 55 |
| 3.12.2.3 | 185 | 67 | N | Y | 1.48 | 47.2% | 53 |
| 3.12.2.4 | 195 | 78 | N | N | 1.54 | 43.1% | 50 |
| 3.12.2.5 | 195 | 82 | N | V | 1.51 | 42.3% | 59 |
| 3.12.2.6 | 195 | 86 | N | Y | 1.58 | 46.4% | 44 |
| 3.12.3.1 | 205 | 60 | Y | V | 1.44 | 42.8% | 36 |
| 3.12.3.2 | 205 | 63.5 | N | Y | 1.37 | 47.2% | 48 |
| 3.12.3.3 | 205 | 67 | Y | Y | 1.39 | 45.6% | 54 |
| 3.12.3.4 | 210 | 76 | N | Y | 0.70 | 76.1% | 57 |
| 3.12.3.5 | 210 | 80 | N | V | 0.76 | 70.8% | 55 |
| 3.12.3.6 | 210 | 84 | N | Y | 0.83 | 73.8% | 52 |

The relative density of the foamed samples decreases with increasing foaming temperature until the temperature approaches the original glass transition temperature of the polymer. At 210° C., the foam was no longer able to withstand the force of the platens and the foam structure is noticeably compressed, as seen in FIG. 16. These samples also contained unfoamed areas. The lack of foaming is likely due to locally high pressure from the clamping force preventing nucleation. This represents the upper limit of foaming temperature in this process. Temperatures between 195° C. and 205° C., however, produce nanocellular foams of low density.

This range of foaming temperatures shows a variety of nanostructure morphologies. The samples foamed at 165° C. and 175° C. show relatively large voids with nanoscale openings between them. Samples foamed at 185° C. and 195° C. show smaller voids with similarly sized nanoscale openings. The samples foamed at 205° C. show relatively homogeneous interconnected nanoscale cells. Finally, the samples foamed at 210° C. show a compressed nanostructure with far fewer cells. The average cell sizes of these samples, as measured by the procedure above, are fairly constant around 50-100 nm.

Example

Solid Skin Removal

This experiment focuses on removing the solid skin and transition layers from nano-foamed samples. The methods involved physically abrading the surface of the samples to reduce the sample thickness and expose the nanocellular core. The solid and microcellular regions may be removed without significantly damaging the porous core region.

The methods of skin removal chosen in this experiment included machining and polishing. Machining experiments were conducted on a standard 3-axis turret mill. A sharp steel, 4-flute end mill was used for machining the sample surface. The samples were adhered to a metal block using 3M brand double-sided carpet tape. The metal block was leveled and clamped into the milling table to hold the sample for machining. Milling speeds ranged from 1400-1800 rpms. The samples surfaces were machined in successive passes of distinct cutting depths, ranging from 0.10-0.30 mm. The feed rate of each pass was controlled by hand and could not be measured.

The polishing experiments were conducted on a Buehler EcoMet® 250 Grinder-Polisher. The machine holds a sample against a polishing wheel with a set force while spinning the sample and the wheel at set speeds. A water jet wets the surface of the polishing wheel during the process. For these experiments, a diamond polishing pad was used to abrade the samples. The samples must be adhered to the surface of a hard steel cylinder using the carpet tape to be held by the sample arm of the machine. These experiments were conducted with a sample force of 1 pound, a polishing wheel rotation of 80 rpm, and a sample rotation of 40 rpm.

Both methods require the use of double-sided tape to hold the sample during skin removal. The samples were separated from the tape by dissolving the tape glue in acetone. The nanoporous core must be exposed on both sides in order to be used as a battery separator. This requires two polishing or machining steps, each of which requires the sample to be held strongly in place. Since the desired resulting membrane is thin, the sample has to be removed from its holder without damaging it.

In order to investigate the extent of open porosity in the abraded samples, experiments were undertaken to visualize the sample's absorption of liquid through the abraded surface. The abraded surfaces all showed considerable hydrophobicity, so water could not be used as the absorbed liquid. Instead, acetone was mixed with permanent black dye from a Sharpie marker and applied to the abraded surfaces using an eye dropper. The absorption of this liquid into the surfaces was observed qualitatively. PEI is rated as having some observed effect after 7 days of exposure to acetone at room temperature. To distinguish the absorption of this solvent into the nanoporous core from a chemical interaction between the two, control experiments were undertaken to observe the interaction between acetone and solid PEI. Acetone droplets were applied to the surface of an unprocessed PEI sample and the unpolished surface of a nanocellular sample. In both cases, no absorption into the polymer was observed before the acetone evaporated.

Figure 17:
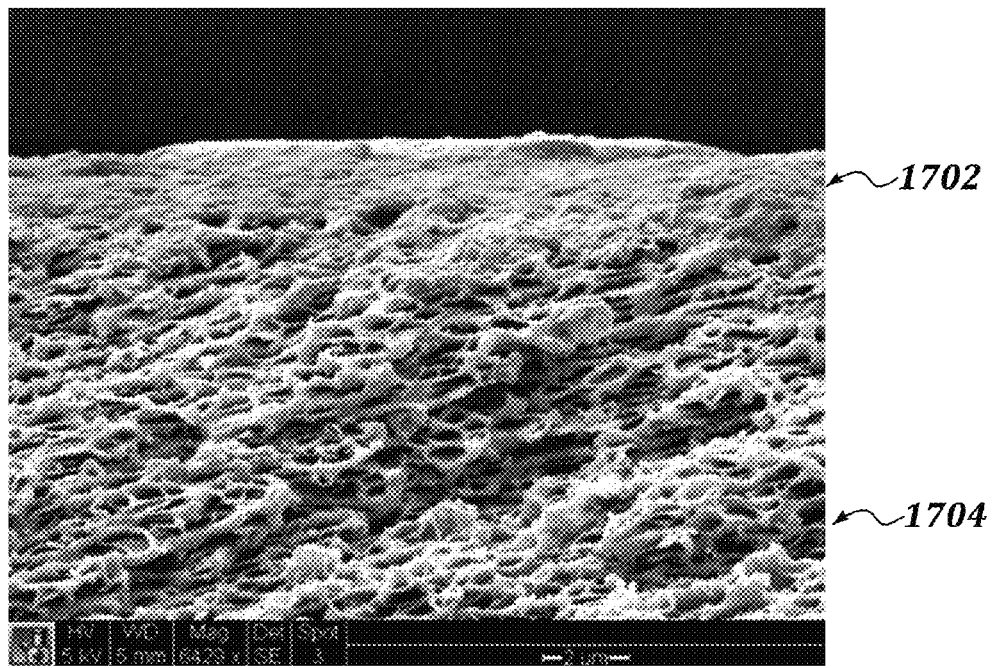
FIG. 17 is an SEM image of a sample with a polished surface.
Figure 18:
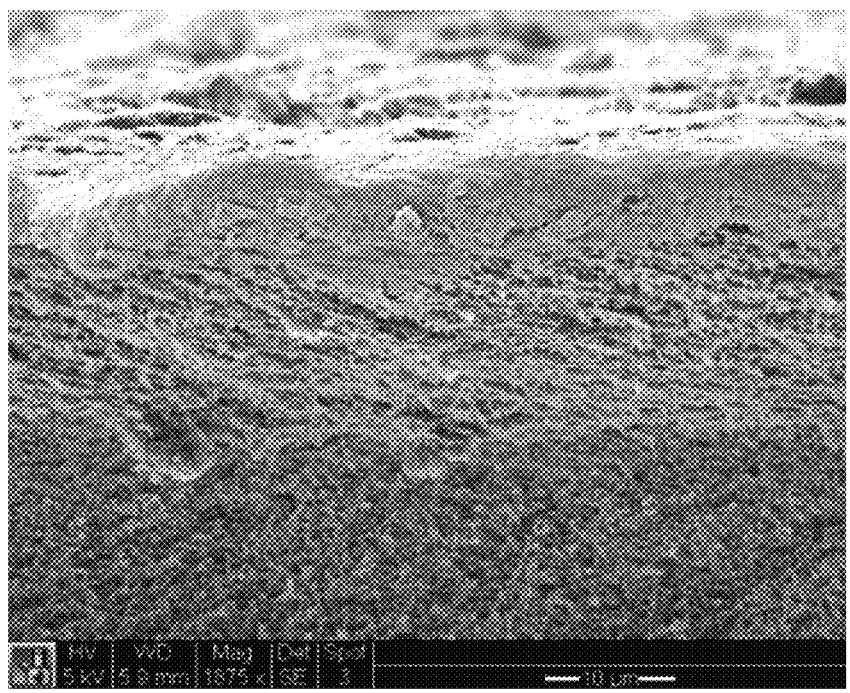
FIG. 18 is an SEM image of a foam sample with a polished surface.
Figure 35:
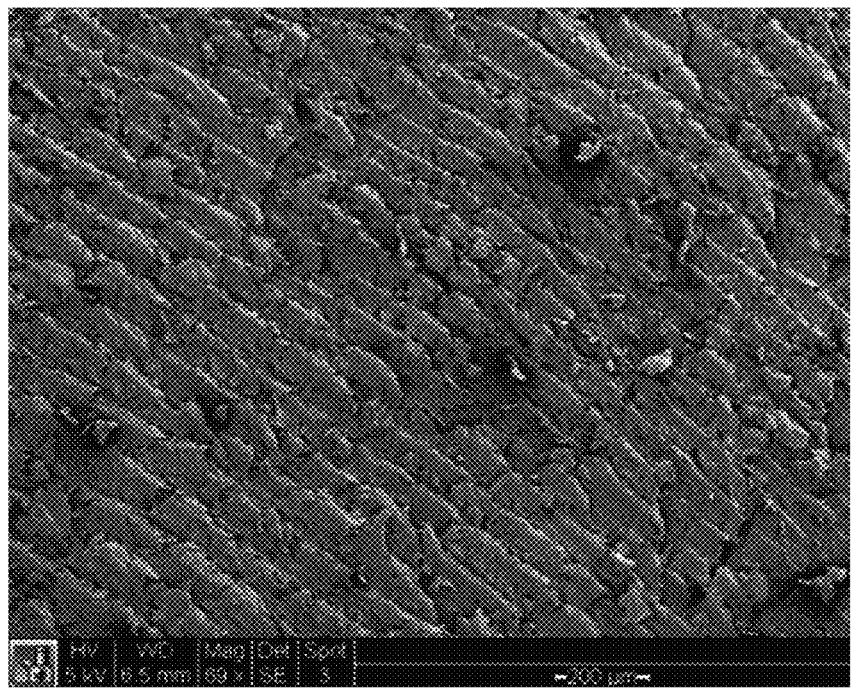
FIG. 35 is an SEM image of a foam sample machined at 1400 rpms and thickness removal of 0.15 mm.
Figure 36:
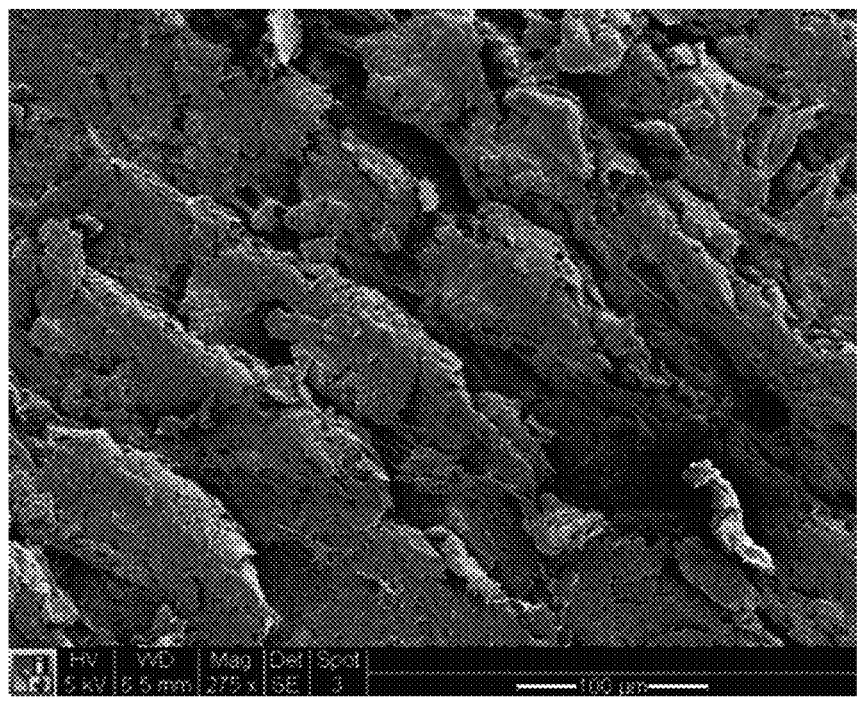
FIG. 36 is an SEM image of a foam sample machined at 1400 rpms and thickness removal of 0.15 mm.
Figure 37:
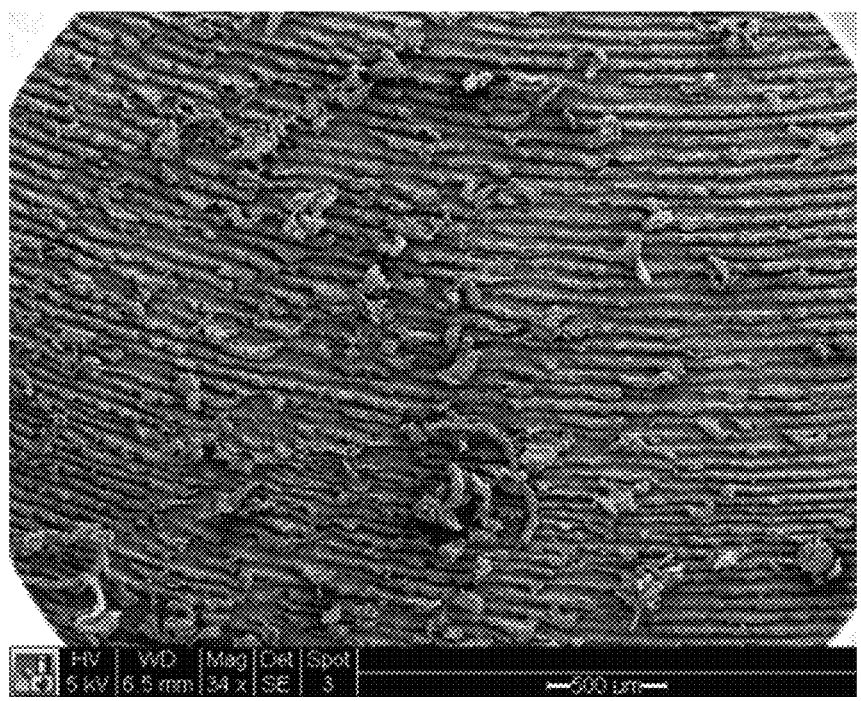
FIG. 37 is an SEM image of a foam sample machined at 1400 rpms and thickness removal of 0.15 mm.
Figure 38:
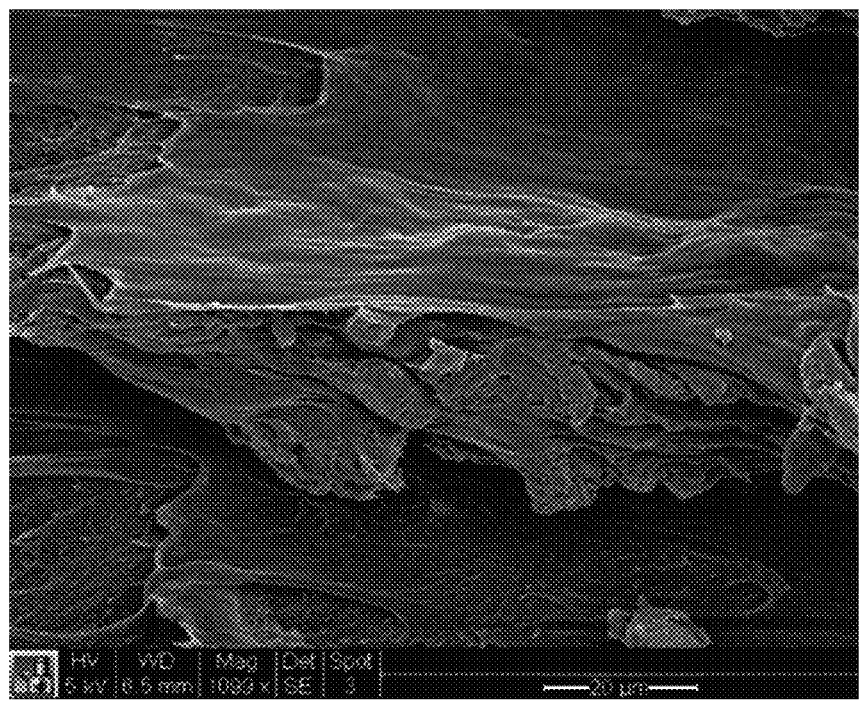
FIG. 38 is an SEM image of a foam sample machined at 1800 rpms and thickness removal of 0.4 mm in 0.1 mm increments.
Figure 39:
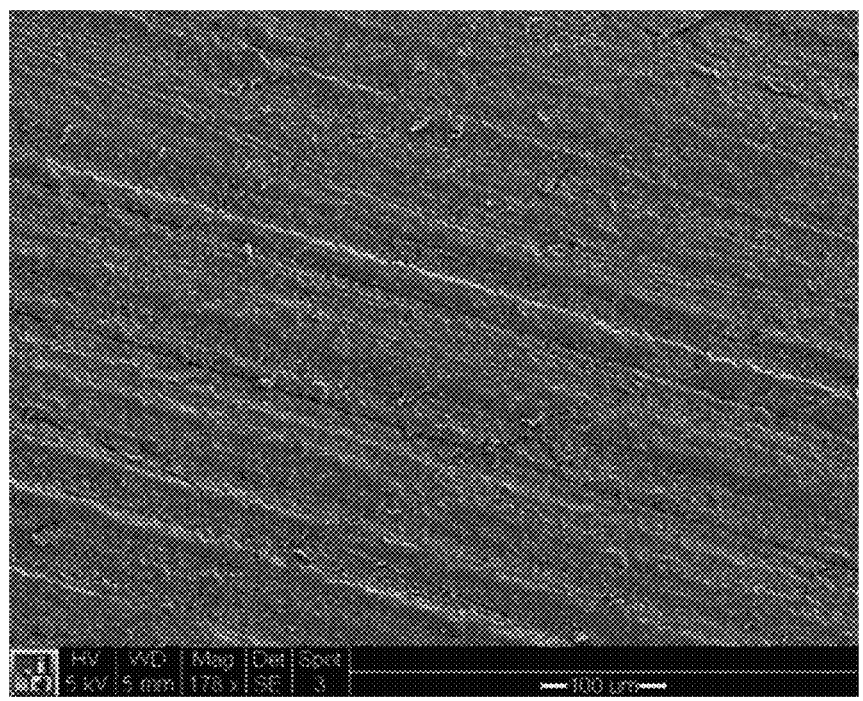
FIG. 39 is an SEM image of a first foam sample that has been polished.
Figure 40:
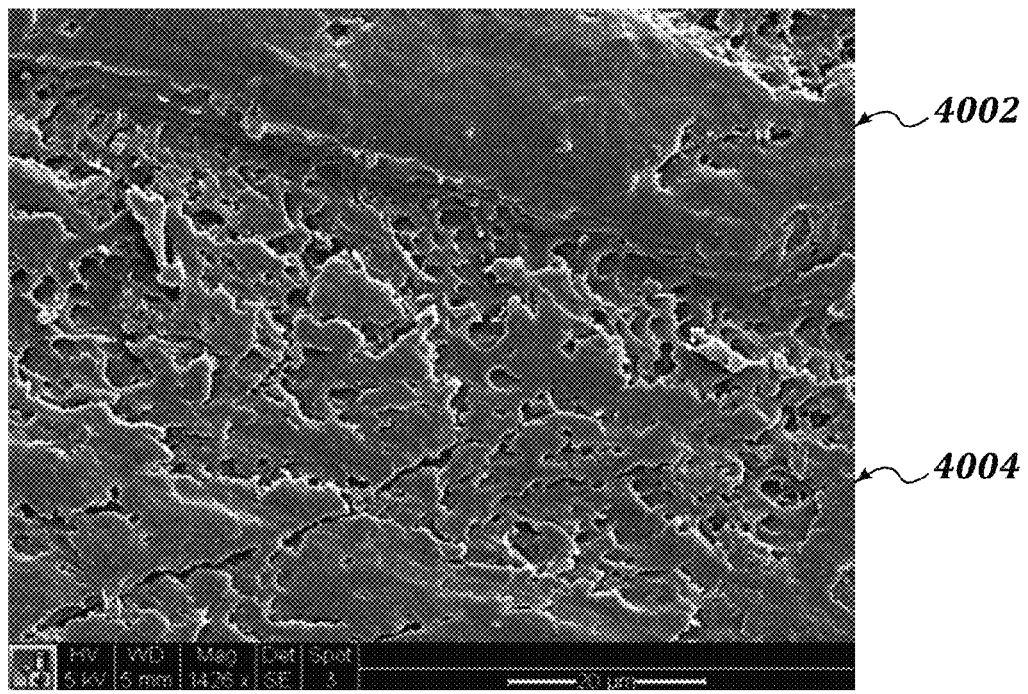
FIG. 40 is an SEM image of the first foam sample that has been polished.
Figure 41:
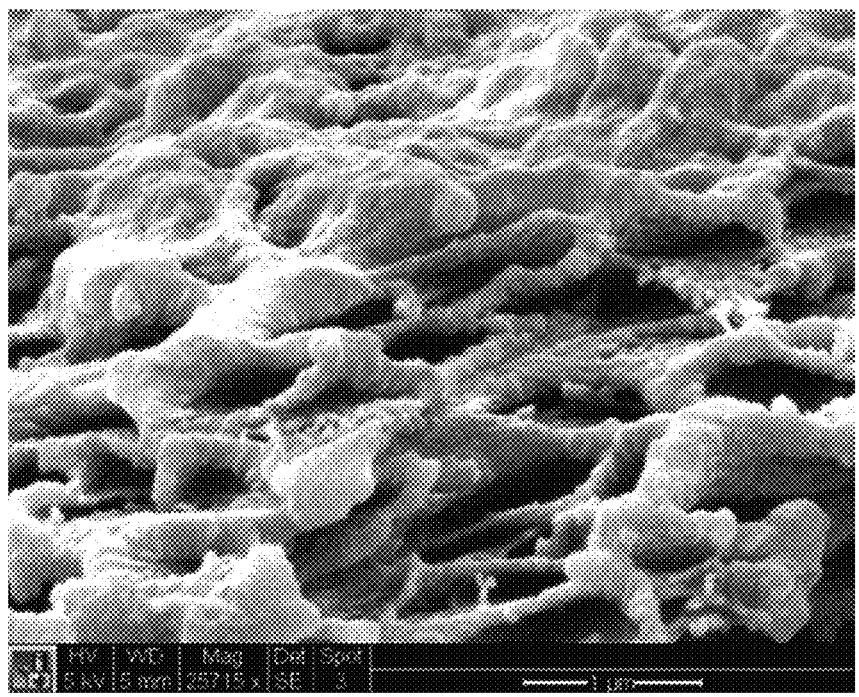
FIG. 41 is an SEM image of the first foam sample that has been polished showing collapse of the transition layer cells.
Figure 42:
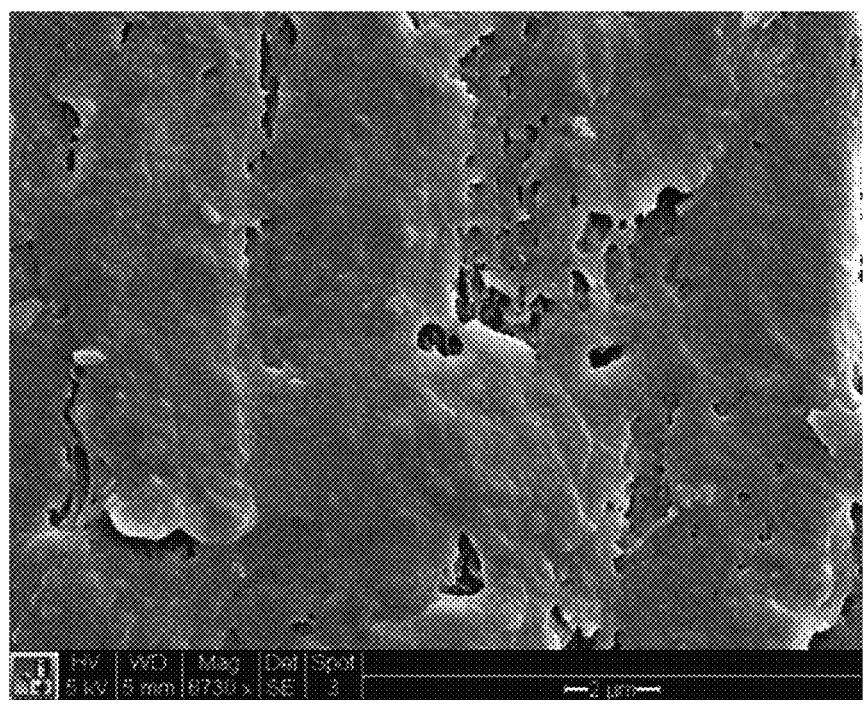
FIG. 42 is an SEM image of the surface of a second foam sample that has been polished.
Figure 43:
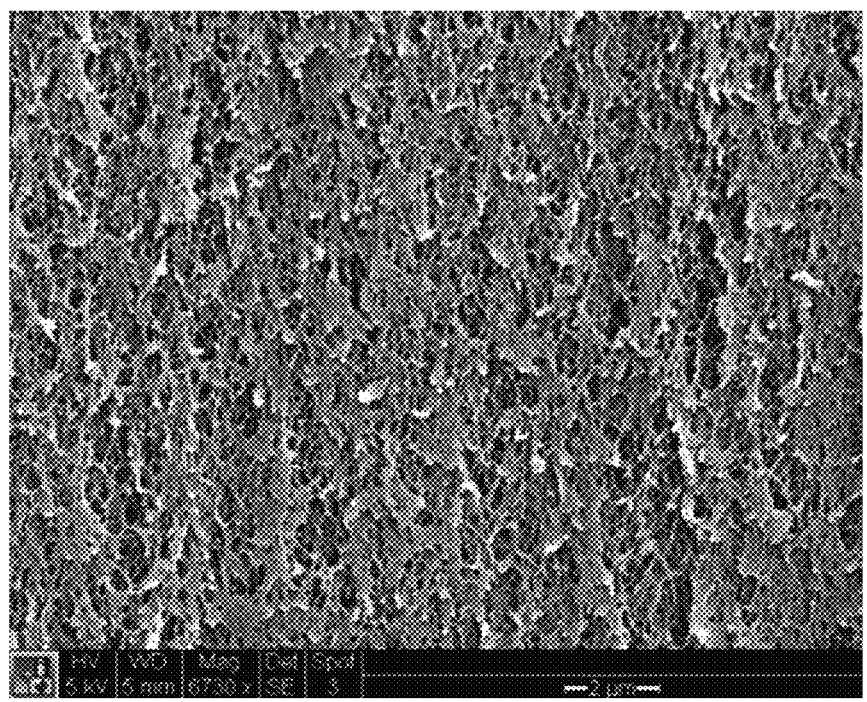
FIG. 43 is an SEM image of the surface of the second foam sample that has been polished.

The machining experiments were successful in removing the solid skin from the foamed samples. The machined surfaces are very rough, with numerous gouges, especially near the edges. The forces involved in machining caused the sample to vibrate and lead to warped, jagged machined samples. SEM images of the machined surface show jagged cuts from the mill, with the underlying cellular structure highly disturbed and solidified. Porosity testing showed limited absorption of acetone and dye into these surfaces. FIG. 35 is an SEM image of a foam sample machined at 1400 rpms and thickness removal of 0.15 mm. FIG. 36 is an SEM image of a foam sample machined at 1400 rpms and thickness removal of 0.15 mm. FIG. 37 is an SEM image of a foam sample machined at 1400 rpms and thickness removal of 0.15 mm. FIG. 38 is an SEM image of a foam sample machined at 1800 rpms and thickness removal of 0.4 mm in 0.1 mm increments. The image shows evidence of a distorted porous structure that has been partly solidified by the machining process. FIG. 39 is an SEM image of a first foam sample that has been polished. FIG. 40 is an SEM image of the first foam sample that has been polished. There is a solid region 4002 and a porous region 4004. FIG. 17 is an SEM image of the first foam sample that has been polished. The polished surface 1702 is seen with the microcellular transition layer 1704 beneath. FIG. 41 is an SEM image of the first foam sample that has been polished showing collapse of the transition layer cells. FIG. 42 is an SEM image of the surface of a second foam sample that has been polished. FIG. 43 is an SEM image of the surface of the second foam sample that has been polished. FIG. 18 is an SEM image of the surface of the second foam sample that has been polished. The polished surface appears at the top of the image over nanoporous core cells.

The polishing experiments resulted in thin, relatively smooth samples with controllable thicknesses. Both samples had an original thickness of 1.61 mm. Sample 1 was polished for 1.5 minutes on each side and had a final thickness of 1.10 mm. Sample 2 was polished for 3.5 minutes on each side and had a final thickness of 0.65 mm. This suggests an average thickness removal speed of 0.15 mm per minute of polishing. The thicker sample did not show evidence of porosity in absorption tests. The thinner sample absorbed acetone and dye readily.

SEM images of the polished surface show regions of smooth solid polymer interspersed with regions of exposed porosity, often aligned with the direction of rotation during polishing. Cross-sectional SEM images show a thin solid layer at the polishing surface. FIG. 17 shows that Sample 1 was polished down to the transition layer 1704. The transition layer cells close to the surface 1702 have been dramatically collapsed by the pressure of the polishing process, forming the solid layer seen in the surface images. FIG. 18 shows that Sample 2 has been polished down to the nanocellular core. A similar solid layer can be seen at the polished surface of Sample 2. However, the nanocellular core does not appear to be collapsed beyond the solid layer.

The milling process does not appear to be a viable method of removing the solid skin from samples foamed in this process. The mill produced jagged, rough surfaces with uneven thicknesses. Furthermore, these surfaces did not appear to have exposed the porous core of the samples. An advantage of the machining process is that mills have a large area of operation and could easily be applied to larger samples.

Polishing does appear to be a promising method of producing porous surfaces on these samples. The polishing process produces flat, smooth samples with relatively constant thickness. The thickness removed from the sample can be easily controlled to produce samples of desired thicknesses.

Both methods succeeded in physically removing the solid skin layer from the sample. However, both methods reproduce a solid skin on the new surface of the sample. This skin is composed of cellular regions that have been compressed back into a solid by the force of the abrasion. However, this skin is not uniform, and has holes and porous regions that expose the underlying porous structure. It is possible that certain polishing pads and conditions could reduce or eliminate this induced solidification, leaving a perfectly porous surface.

These experiments confirmed that the nanocellular foam structure has an open porosity. The samples readily absorb acetone as compared to solid PEI. Experiments with dyed acetone showed dye penetrating one polished surface and emerging from the opposite surface shortly thereafter. However, it is important to note that these samples are hydrophobic and so could not be used in an aqueous battery without further modification. Interestingly, these samples also absorb liquid nitrogen. This phenomenon was noticed while preparing the samples for SEM imaging. It is unknown whether the absorbed liquid nitrogen has any effect upon the fracture surface.

The thinnest sample produced in preliminary polishing experiments was 80 µm thick. However, the final thickness desired is about 25 µm.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for making a flat, blister-free foam with an open, interconnected cellular structure, comprising:
    saturating a polymer with a gas in a vessel at conditions wherein the gas is supercritical and producing a gas-saturated polymer;
    desorbing gas from the gas-saturated polymer;
    placing the gas-saturated polymer in a press;
    in the press, heating the gas-saturated polymer at a temperature to allow cell growth while the press applies a clamping force to maintain flatness and produces a flat blister-free foam; and
    removing a solid skin layer from the foam to expose an open, interconnected cellular structure.

2. The method of claim 1, wherein the gas-saturated polymer is desorbed for about 35 minutes or greater.

3. The method of claim 1, wherein the gas-saturated polymer is heated in the press for about 3 minutes or greater.

4. The method of claim 1, wherein the polymer is a thermoplastic polymer.

5. The method of claim 1, wherein the polymer is polyetherimide.

6. The method of claim 1, wherein the clamping force is 1 ton or less.

7. The method of claim 1, wherein the foam includes an open, interconnected nanocellular structure, wherein the cellular structure comprises cells having a diameter of 50 to 100 nm.

8. The method of claim 1, further comprising polishing the foam to remove a skin layer.

* * * * *